(12) United States Patent
DeLean

(10) Patent No.: US 7,369,685 B2
(45) Date of Patent: May 6, 2008

(54) VISION-BASED OPERATING METHOD AND SYSTEM

(75) Inventor: Bruno C. DeLean, Andorra la Vella (AD)

(73) Assignee: Identix Corporation, Bloomington, MN (US)

( * ) Notice: Subject to any disclaimer, the term of this patent is extended or adjusted under 35 U.S.C. 154(b) by 482 days.

(21) Appl. No.: 10/116,839

(22) Filed: Apr. 5, 2002

(65) Prior Publication Data

US 2003/0190076 A1   Oct. 9, 2003

(51) Int. Cl.
G06K 9/00   (2006.01)
G06K 9/62   (2006.01)

(52) U.S. Cl. .................. 382/118; 382/115; 382/209

(58) Field of Classification Search ........ 382/115–118, 382/124, 209, 305; 707/6
See application file for complete search history.

(56) References Cited

U.S. PATENT DOCUMENTS

| | | | |
|---|---|---|---|
| 4,641,349 A | | 2/1987 | Flom et al. |
| 5,067,162 A | * | 11/1991 | Driscoll et al. ............. 382/126 |
| 5,164,992 A | | 11/1992 | Turk et al. |
| 5,345,517 A | * | 9/1994 | Katayama et al. .......... 382/299 |
| 5,412,738 A | | 5/1995 | Brunelli et al. |
| 5,450,504 A | | 9/1995 | Calia |
| 5,561,718 A | | 10/1996 | Trew et al. |
| 5,612,686 A | | 3/1997 | Takano et al. |
| 5,625,704 A | | 4/1997 | Prasad |
| 5,787,186 A | | 7/1998 | Schroeder |
| 5,802,208 A | | 9/1998 | Podilchuk |
| 5,835,616 A | * | 11/1998 | Lobo et al. ................ 382/118 |
| 5,850,470 A | | 12/1998 | Kung et al. |
| 5,852,669 A | | 12/1998 | Eleftheriadis et al. |

(Continued)

FOREIGN PATENT DOCUMENTS

EP   0 918 300 A   5/1999

(Continued)

OTHER PUBLICATIONS (From IDS) Samal et al. ("Automatic Recognition and Analysis of Human Faces and Facial Expressions: A Survey," Pattern Recognition, vol. 25, No. 1, 992, pp. 65-77).*

(Continued)

Primary Examiner—Matthew C. Bella
Assistant Examiner—Yubin Hung
(74) Attorney, Agent, or Firm—Beyer Weaver LLP

(57) ABSTRACT

A vision-based operating system is provided in which a computer-based system accepts visual inputs and takes appropriate actions in a wide variety of environments. One environment is a security environment in which the vision-based operating system acquires an image of a face and determines, with an arbitrarily small probability of a false positive, whether the face is of a person who is authorized to enter the environment. The method employed may include acquiring a digital image for comparison to a reference image and identifying a group of pixels in the acquired image. A pixel group in the reference image that is the best match for the pixel group in the acquired image is selected. These steps are repeated for at least one more group of pixels. The relative locations of the selected pixel groups in the reference images and the pixel groups in the acquired image are compared, and the probability that the relative locations occurred randomly is determined.

27 Claims, 23 Drawing Sheets

U.S. PATENT DOCUMENTS

| | | | |
|---|---|---|---|
| 5,917,928 A * | 6/1999 | Shpuntov et al. | 382/124 |
| 5,956,482 A | 9/1999 | Agraharam et al. | |
| 5,991,429 A | 11/1999 | Coffin et al. | |
| 6,016,148 A * | 1/2000 | Kang et al. | 345/622 |
| 6,035,055 A | 3/2000 | Wang et al. | |
| 6,072,892 A | 6/2000 | Kim | |
| 6,108,437 A | 8/2000 | Lin | |
| 6,111,517 A | 8/2000 | Atick et al. | 340/825.34 |
| 6,128,397 A | 10/2000 | Baluja et al. | |
| 6,128,398 A | 10/2000 | Kuperstein et al. | |
| 6,137,896 A | 10/2000 | Chang et al. | |
| 6,147,678 A | 11/2000 | Kumar et al. | |
| 6,188,777 B1 | 2/2001 | Darrel et al. | |
| 6,292,575 B1 | 9/2001 | Bortolussi et al. | |
| 6,301,370 B1 | 10/2001 | Steffens et al. | |
| 6,351,556 B1 * | 2/2002 | Loui et al. | 382/164 |
| 6,377,995 B2 | 4/2002 | Agraharam et al. | 709/231 |
| 6,430,306 B2 | 8/2002 | Slocum et al. | 382/118 |
| 6,516,213 B1 * | 2/2003 | Nevo | 600/424 |
| 6,570,570 B1 * | 5/2003 | Suzuki et al. | 345/505 |
| 6,606,398 B2 * | 8/2003 | Cooper | 382/118 |
| 6,690,828 B2 * | 2/2004 | Meyers | 382/218 |
| 7,076,664 B2 | 7/2006 | Murase et al. | |
| 2001/0031073 A1 | 10/2001 | Tajima | |
| 2002/0023020 A1 * | 2/2002 | Kenyon et al. | 705/26 |
| 2002/0046347 A1 * | 4/2002 | Murase et al. | 713/201 |
| 2002/0176627 A1 * | 11/2002 | Monden | 382/219 |

FOREIGN PATENT DOCUMENTS

| | | |
|---|---|---|
| EP | 0 932 115 A | 7/1999 |
| EP | 0 962 894 | 12/1999 |
| JP | 11-134500 A | 5/1999 |
| JP | 2000357231 A * | 12/2000 |
| WO | WO 99 04360 A | 1/1999 |
| WO | WO 01 75774 | 10/2001 |

OTHER PUBLICATIONS

Altan et al. ("Computer Architecture and Implementation of Vision-Based Real-Time Lane Sensing," Proc. 1992 Symposium on Intelligent Vehicles, Jun. 29-Jul. 1, 1992, pp. 202-206).*

Rosenfeld et al., Digital Picture Processing, 2nd ed., vol. 2, 1982 (p. 10).*

Ming-Hsuan Yang et al., "Detecting Faces in Images: A Survey" *IEEE Transactions On Pattern Analysis And Machine Intelligence,* IEEE Inc., New York, vol. 1, No. 24, Jan. 2002, pp. 34-58, XP001140784 ISSN: 0162-8828.

Samal A., et al., "Automatic Recognition And Analysis Of Human Faces And Facial Expressions: A Survey" *Pattern Recognition,* Elsevier, Kidlington, GB, vol. 25, No. 1, 1992, pp. 65-77, XP000248492 ISSN: 00314-3203.

International Search Report and Written Opinion Of The International Searching Authority dated Nov. 3, 2004, for related PCT Application No. PCT/US2004/010171.

Bichsel, "Automatic Interpolation and Recognition of Face Images by Morphing," IEEE Proceedings of $2^{nd}$ Int'l Conf. on Automatic Face and Gesture Recognition, Oct. 14-16, 1996, pp. 128-135.

U.S. Office Actioni mailed Feb. 9, 2007, from U.S. Appl. No. 10/410,750.

Office Action mailed Oct. 16, 2007 in U.S. Appl. No. 10/410,750, filed Apr. 9, 2003.

English translation of Japanese Office Action dated Feb. 5, 2008 from corresponding Japanese Application No. 2003-582704.

* cited by examiner

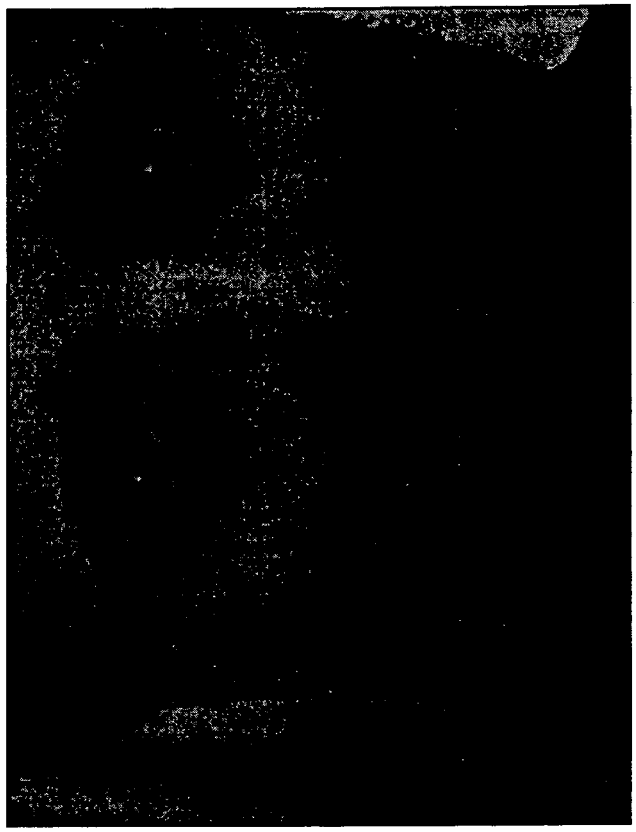
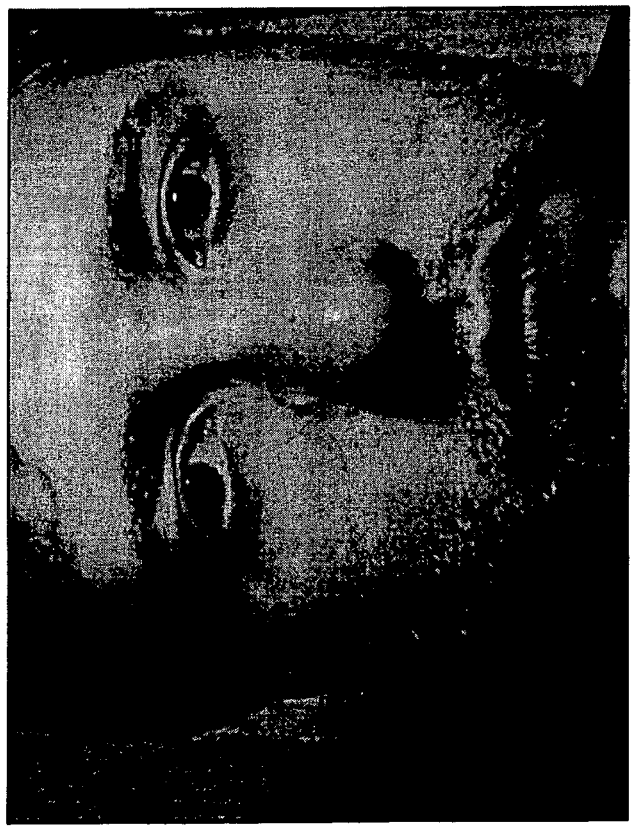
FIG. 20

MASK A
MASK B
RECONSTRUCTION OF BOTH IMAGES THE SQUARES SHOWS THE PIXEL BLOCKS WHERE THE SIMILARITIES HAS BEEN ACCEPTED.
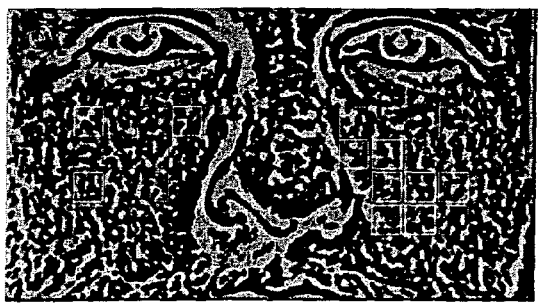
IN THIS CASE THE NUMBER OF SUCCESSFUL SIMILARITIES WERE 20. WITH THE PARAMETERS OF SEARCH AND TOLERANCE AREA USED DURING THIS EXPERIMENT, THE PROBABILITY THAT THESE TWO FACES ARE DIFFERENT IS LESS THAN $1/10^{10}$
*FIG. 21*

VISION-BASED OPERATING METHOD AND SYSTEM

BACKGROUND

Computer systems have become nearly ubiquitous, ranging from multi-purpose devices such as servers, personal computers, laptop computers and mainframe computers to special purpose devices such as application specific integrated circuits and processors disposed in a wide range of appliances, tools, and other devices. Computers typically take their inputs from a common set of interfaces, including keyboards, mouse devices, microphones, cameras, sensors, and the like. However, while a range of input devices are known for special purpose computers, processing systems for general purpose computers currently focus on two types of inputs: character- and cursor-based inputs from keyboards, mouse devices, touch screens, and the like, and voice-based inputs from microphones (for speech recognition). While there are many applications for those computers, in certain situations it may be difficult for users to provide the necessary inputs. For example, a child or elderly person may not be sophisticated enough to provide the correct keyboard or voice commands, but may be able to make gestures that have recognizable meaning, such as gestures for help. In other situations there may be no available user, making voice- or character-based instructions unavailable. Nevertheless, changes in a given environment may give sufficient visual data to trigger a need for a relevant action (e.g., smoke in a room triggers a need for an alarm). Thus, a need exists for a general purpose processing system that will accept and operate based on image or visual inputs, either alone, or in combination with conventional inputs.

One area in which visual inputs can be used to advantage is face recognition. Face recognition technologies are known in which an image is processed in order to determine whether a face matches one or more reference faces, such as for security purposes. Such technologies may be used, for example, to determine whether a user is permitted entry into a home, office, or similar environment. Current facial recognition approaches, which typically involve comparison of facial features between multiple images and calculations that assess the degree of match, are plagued with problems. One problem is the tendency of such systems to produce false positive matches. A false positive result means that an unauthorized user may be permitted entry into a home, for example. The tendency to produce false positive matches means that users who are seeking to be recognized are typically given only a limited number of attempts to be recognized. However, systems may also produce false negatives; thus, the limitations that are necessary to prevent false positives tend to increase the number of false negatives to the point that legitimate users are denied access in many instances. Thus, a need exists for a system that can limit the instance of false positive matches to an arbitrarily low level, so that a user who wants to be recognized can attempt to be recognized as many times as he or she wishes, without fear that an unauthorized user will be permitted entry.

SUMMARY

Provided herein is a vision-based processing system that can take an image from an environment, process the image (optionally without requiring additional user input or interaction) and take an action based on the content of the image. Embodiments include processing face images for purposes of securing entry into an environment such as a home or office. Other embodiments include using images to monitor environments, such as for safety purposes. A wide range of embodiments are disclosed herein, each taking advantage of the ability to process images directly, rather than requiring the intervention of a keyboard- or mouse-based user input.

Also provided herein are methods and systems for confirming whether an image of a face matches a reference image, wherein the probability of a false positive may be made arbitrarily small. Thus, such methods and systems allow a user who wishes to be recognized to try as many times as desired until a match occurs, without fear that an unauthorized user will be permitted access.

In embodiments, provided herein are methods and systems for determining whether an acquired image matches a reference image. The methods and systems provide for acquiring a digital image for comparison to a reference image; identifying a group of pixels in the acquired image; selecting the pixel group in the reference image that is the best match for the pixel group in the acquired image; repeating the preceding steps for at least one more group of pixels; comparing the relative locations of the selected pixel groups in the reference images and the pixel groups in the acquired image; and determining the probability that the relative locations occurred randomly.

In embodiments the methods and systems compare the probability of a random match to a threshold probability for concluding that the images match. The threshold can be set so that the probability of a false positive is arbitrarily low.

In embodiments, images are filtered, such as by determining the luminance of a pixel based on an average of values of neighboring pixels; comparing the value of the luminance of the pixel to a threshold value; setting the filtered value of the pixel to zero if the luminance is below the threshold; and setting the filtered value of the pixel to one if the luminance is equal to or greater than the threshold value. In embodiments images are normalized by positioning known features, such as eyes, at known coordinates.

In embodiments, methods and systems for determining a match between pixel groups of an acquired image and the pixel groups of the reference image include defining a first vector between the first pixel group of the acquired image and a second pixel group of the acquired image; defining a second vector between the first pixel group of the reference image and the second pixel group of the reference image; and calculating an absolute value of the difference between the first vector and the second vector. This calculation can be done for as many pixel groups as desired.

In embodiments, the methods and systems described herein provide for comparing the probability of a random match to a threshold probability for concluding that the images match; repeating the comparison steps for a different reference image; and allowing unlimited number of mismatches before allowing a match to one of the reference images. Upon determining a match, the acquired image can be added to the database of reference images to aid further matches.

In embodiments, methods and systems described herein include a processor-based system having an image based-operating system. The system may include a camera, located in an environment, and a computer-based system in data connection with the camera, the computer-based operating system having an operating system that is capable of operating the computer-based system in response to image data acquired by the camera. The operating system may be capable of operating the computer-based system solely based on the image data. The system may be provided along with another system that is capable of receiving instructions from the computer-based system in response to actions taken by the operating system. The other system might be a security system, an alarm system, a communications system, an automated teller system, a banking system, a safe, another camera system, a speaker system, a microphone, a computer, a server, a laptop, a handheld computer, a bluetooth enabled device, an entertainment system, a television, a recorder, an appliance, a tool, an automobile system, a transportation system, a vehicle system, a sensor, an emitter, a transmitter, a transceiver, an antenna, a transponder, a gaming system, a computer network, a home network, a local area network, a wide area network, the Internet, the worldwide web, a satellite system, a cable system, a telecommunications system, a modem, a telephone, or a cellular phone, for example.

In embodiments the operating system is capable of identifying a characteristic in an image and taking an action based on the characteristic. The characteristic might be a matching face, a matching code, motion, a biometric, a non-match element, a structure in an environment, an emotion of a face, presence of item in an environment, absence of an item in an environment, movement of an item, appearance of a new item in an image, smoke, fire, water, a leak, damage to an environment, action of a person, action of a pet, action of a child, action of an elderly person, a face, a gesture, positioning of a face in front of a camera, change of an image, detection of a face in the image, speech, lip movement, a finger movement, a hand movement, an arm movement, a leg movement, a movement of the body, a movement of the head, a movement of the neck, a shoulder movement, or a gait, for example. In embodiments, the characteristic is matching a face and wherein the action is opening a security system.

The methods and systems described herein can be disposed in many environments, such as, for example, an airport, an airplane, a transportation venue, a bus, a bus station, a train, a train station, a rental car venue, a car, a truck, a van, a workplace, a venue, a ticketed venue, a sports arena, a concert arena, a stadium, a sports venue, a concert venue, a museum, a store, a home, a pool, a gym, a health club, a golf club, a tennis club, a club, a parking lot, a computer, laptop, an electronic commerce environment, an ATM, a storage location, a safe deposit box, a bank, or an office.

Where the system matches a face in order to allow an action, the system may also require further confirmation, such as providing a key, entering a code, inserting a card, recognizing a voice, recognizing a fingerprint, and recognizing another biometric.

Method and systems disclosed herein may further include locating a camera in an environment; capturing an image of the environment, the image comprising an image of an event of the environment; providing a vision-based operating system for processing the image; processing the image to identify a characteristic of the event; and taking an action based on the characteristic.

BRIEF DESCRIPTION OF THE FIGURES

FIG. 20 depicts an image of a face prior to application of the filtering process depicted in FIG. 19.

FIG. 21 depicts an image of a face after application of the filtering process of FIG. 19.

DETAILED DESCRIPTION

Figure 1:
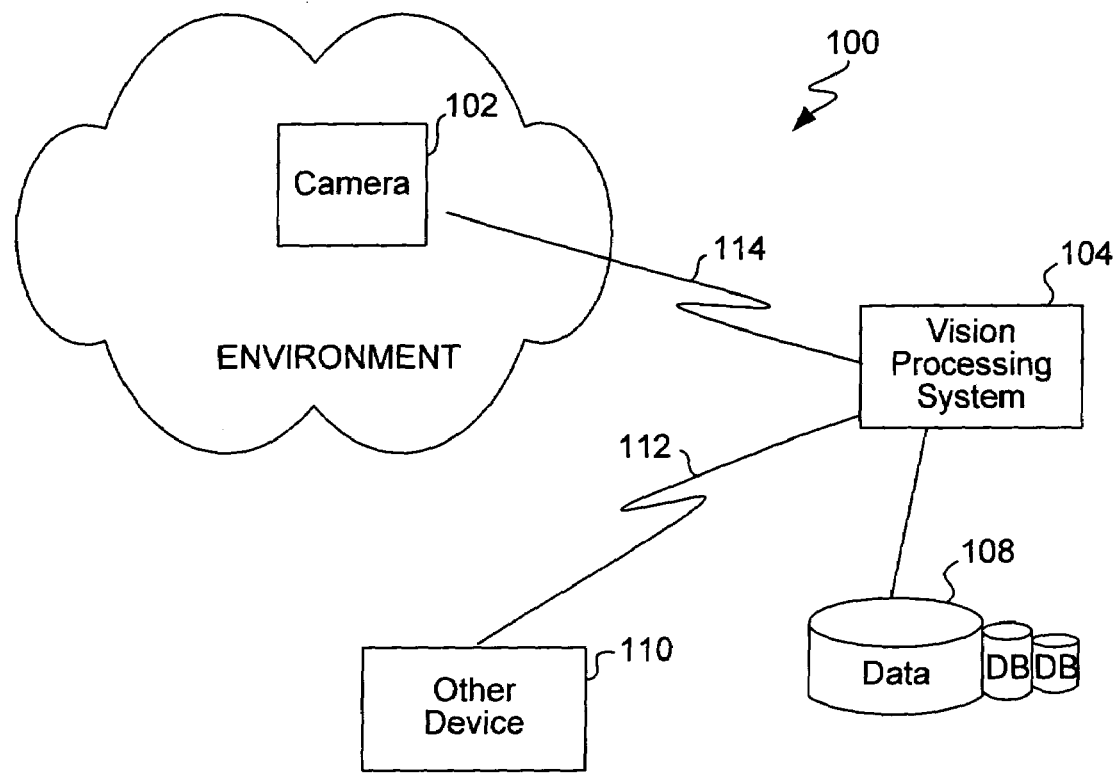
FIG. 1 is a high-level schematic diagram of system components for a vision-based system.

Referring to FIG. 1, a system 100 is provided, that is capable of being disposed in a wide variety of environments. The system 100 may comprise several different elements, including a camera 102, or similar image-capturing facility, and vision processing system 104. The system 100 may optionally include further elements, such as a data storage facility 108, and another computer-based device 110.

The camera 102 may be any device capable of capturing image data, such as a digital camera, a film camera, a video camera, a still-image camera, a movie camera, a beta recorder, a handheld camera, a fixed camera, a motion-sensing camera, or the like. The camera 102 may capture images in an environment and transmit the images to a vision processing system 104. In embodiments, the images may be transmitted as digital data in the form of images comprising pixels. In other embodiments, the images may be taken by the camera in non-digital form and converted by the vision processing system 104 into digital form for processing. The camera 102 may be equipped with an interface, to permit its operation. The interface may be a direct user interface for use by a human user, such as a series of buttons or dials that allow the user to turn the camera on and off, to record image data, to position the lens, to change lens settings, to zoom in or out, to record, or the like. The interface may also be an interface that is accessed by or through another system, such as a computer. In one preferred embodiment the vision processing system 104 may access an interface of the camera 102 and control the camera 102.

The data storage facility 108 may be any suitable facility for storing data, such as RAM or ROM memory, a file, a Smart Media card, a diskette, a hard drive, a disk, a database, a zip drive, a data warehouse, a server, a mainframe computer, or other suitable facility for storing digital data. The data storage facility 108 may comprise an interface for allowing the vision processing system or a user to use the data storage facility to store, manipulate and retrieve data for any conventional purpose.

The vision processing system 104 is discussed in more detail below. The vision processing system 104 may take image data from the camera 102 and take appropriate actions in response to those images. In embodiments, the vision processing system 104 may also interact with the data storage facility 108 to store, manipulate or retrieve data. In other embodiments, the vision processing system 104 may also interact with the other device 110 or the camera 102. In some embodiments the vision processing system 104 may send control signals to the other device 110 or the camera 102, such as to activate or position the other device 110 or the camera 102. In other embodiments, the other device 110 or the camera 102 may send signals to the vision processing system 104, making possible interactive, or sensor-feedback loops, where the systems interact based on events or conditions in the environment, or based on user interaction with one or more of the systems.

In embodiments a communication facility 114 may connect the camera 102 and the vision processing system 104. In other embodiments the camera 102 and the vision processing system 104 may be integrated in a single device. The communication facility 114 may be any suitable facility for transferring data, such as a cable, wire, network, wireless communication facility, Bluetooth facility, 802.11 facility, infrared, laser, fiber optic, radio, electromagnetic, acoustic, or other communication facility.

The other device 110 may be any other device capable of being put in communication with the vision processing system 104, such as via a second communication facility 112, which may be of any type mentioned in connection with the communication facility 114 discussed above. The other device 110 may be selected from a wide group of different possible devices, including, without limitation, an alarm system, a sound system, a sensor, an entertainment system, a video display system, a security system, a lock, a gate, a recording system, a measurement device, a medical device, a system for administering medicine, an appliance, an oven, a washing machine, a dryer, a stove, a dishwasher, a refrigerator, a freezer, a personal computer, a laptop computer, a PDA, a handheld computer, a server, a mainframe computer, a television, a client computer, a DVD player, a stereo system, a VCR, a compact disc player, a personal television recorder, a telephone, and a video phone. In embodiments, the vision processing system 104 may be integrated with or on board any one of these or any other processor-based device.

Figure 2:
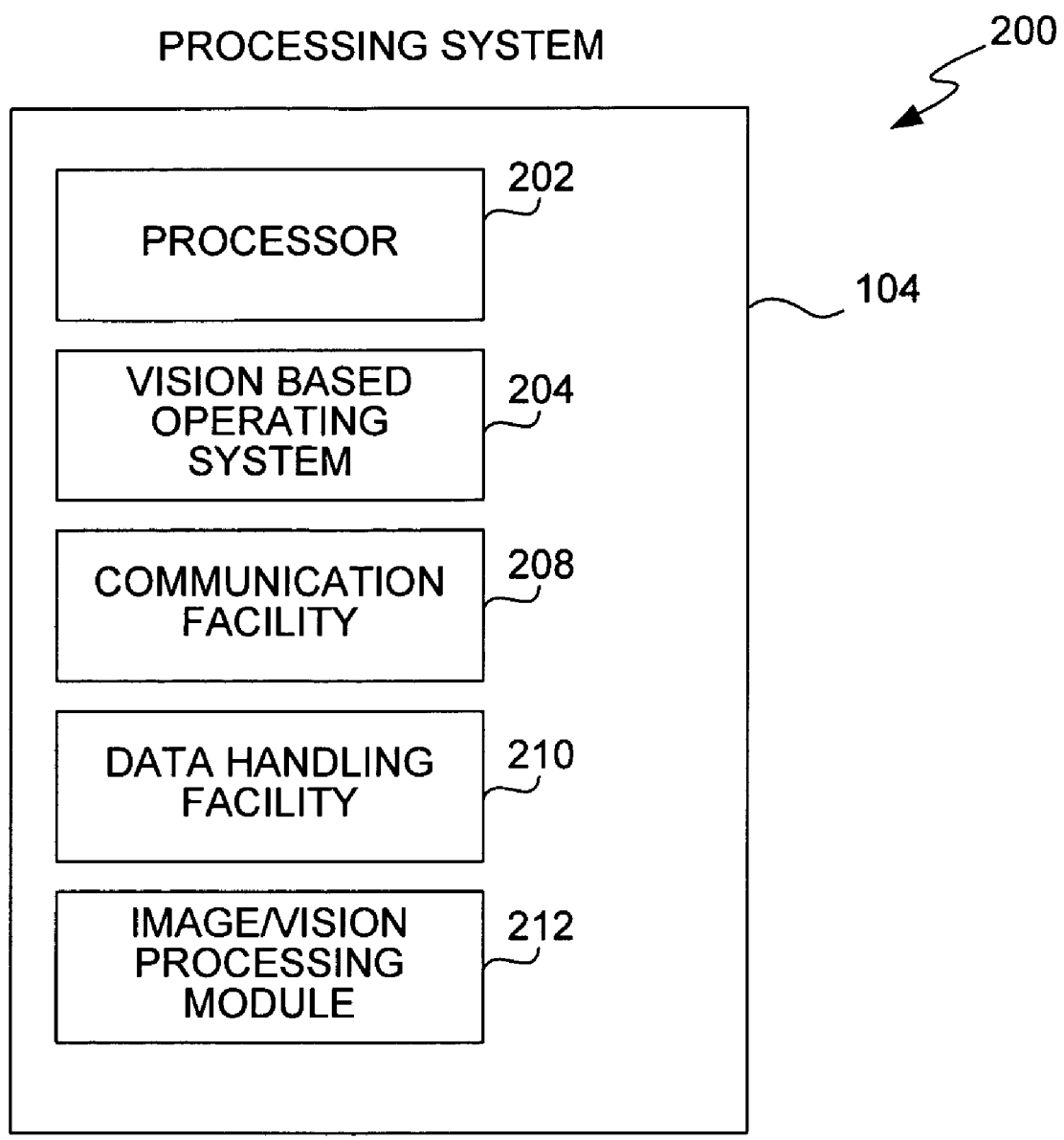
FIG. 2 is a schematic diagram of components of a vision processing system.

Referring to FIG. 2, a schematic diagram 200 shows an embodiment of components of a vision processing system 104. The vision processing system 104 may include various elements, such as a processor 202, a vision-based operating system 204, a communication facility 208, a data handling facility 210, and an image processing module 212.

The processor 202 may be any conventional facility for handling processing functions, such as a microprocessor, chip, integrated circuit, application specific integrated circuit, board, circuit, microcontroller, software, firmware, or combination of the above. In an embodiment, the processor 202 is a Pentium-based processor such as those used to operate personal computers.

The vision-based operating system 204 is discussed in further detail below. In contrast to conventional operating systems that primarily respond to events that arise from keypad, mouse, clock, or similar events, the vision-based operating system is configured to take inputs in the form of images, either in lieu of or in addition to other events that can serve as inputs to conventional operating systems. Thus, the vision-based operating system is equipped with a facility for handling images that are digitized into pixels and taking actions in response to the content of the images.

The communication facility 208 may be any suitable facility for enabling the vision processing system 104 to communicate or interact with other systems or devices that are external to the vision processing system 104. Thus, it may include hardware (e.g., a modem, DSL modem, connector, bus, port, serial port, USB port, network card or the like), software (communications software, network software, or the like), firmware, or a combination of these.

The data handling facility 210 may comprise hardware elements, such as RAM, ROM, a hard disk, a memory card, a smartmedia card, of other similar data handling facilty, as well as software elements such as database software or other software for handling any data-related tasks that the operating system 204 may require for interacting with the data storage facility 108.

The image processing module 212 may comprise hardware, software, firmware, or a combination of them for processing images, including facilities for executing various algorithms and sub-processes under control of the vision-based operating system 204, to store, manipulate, retrieve and otherwise take actions on, or in response, to digital images that serve as inputs to the image processing module 212. The image processing module 212 takes images as inputs and outputs any of a variety of signals, including instructions to the vision-based operating system, instructions for storing, manipulating or retrieving data, messages or other communications for the communications facilities 112, 114, images, text, sounds, or other signals. Functions of the image processing module 212 in a preferred embodiment are discussed further below.

Figure 3:
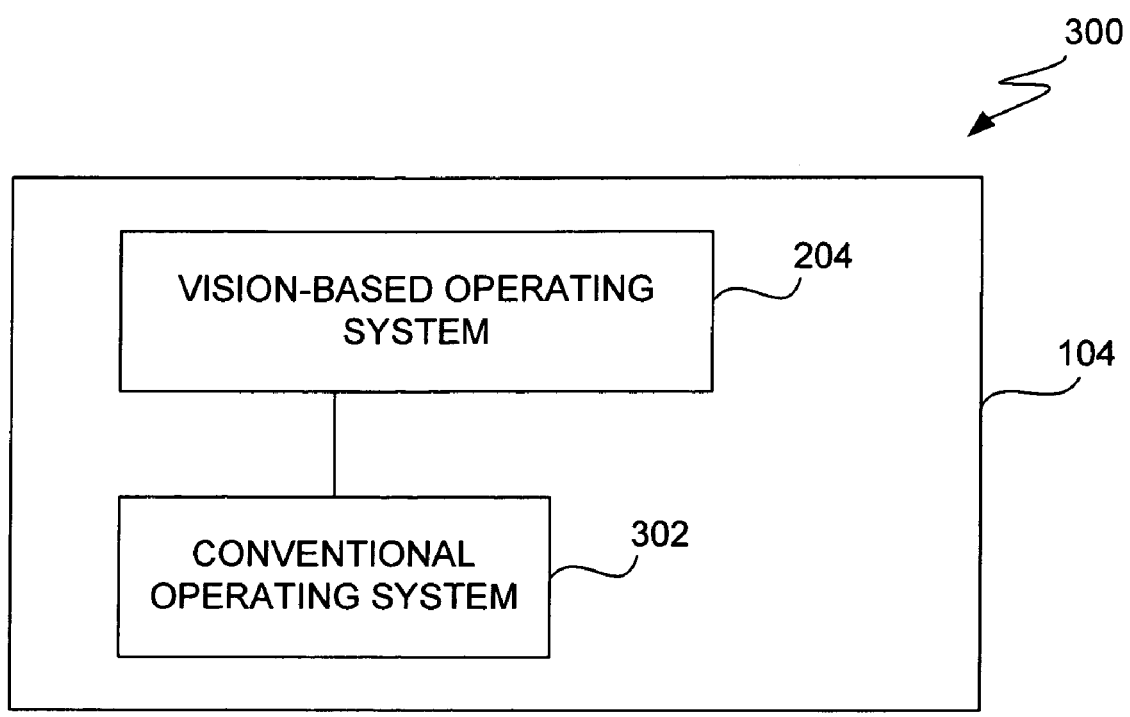
FIG. 3 is a schematic diagram of additional components of the vision-based processing system of FIG. 2.

Referring to FIG. 3, a further detail of an embodiment of the vision-based operating system 204 is displayed in a schematic diagram 300. In this embodiment, the vision-based operating system 204 serves as the primary operating system of the vision processing system 104, so that the primary inputs of the vision processing system 104 from its environment are images or other vision-based data. The vision-based operating system 204 may optionally control a subsidiary operating system, which may be a conventional operating system 302, that responds to signals from the vision-based operating system 204. The conventional system may be a Windows, MAC, Unix, Linux, or other conventional operating system such as may exist or be developed in the future for taking actions in response to events or conditions in the vision processing system 104. Thus, for example, the vision-based operating system may initiate events that are picked up by a loop running in the Windows operating system, to control other aspects of the vision processing system 104, or to send signals elsewhere, either internally or externally.

Figure 4:
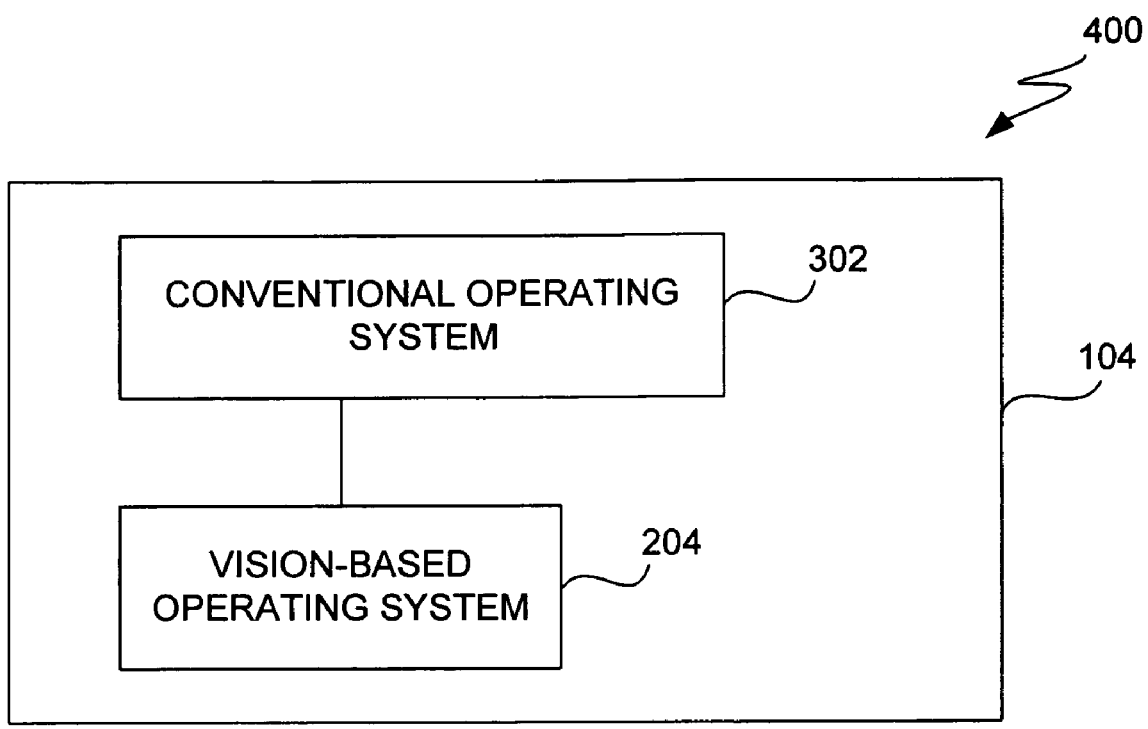
FIG. 4 is a schematic diagram of an alternative embodiment of a vision-based processing system.

Referring to FIG. 4, as depicted in a schematic diagram 400, in another embodiment the roles of the vision-based operating system 204 and the conventional operating system 302 may be reversed relative to the configuration of FIG. 3. In the embodiment of FIG. 4, the conventional operating system 302 controls the vision-based operating system, which operates as a sub-system. In this system, the conventional operating system may recognize certain inputs or events as comprising images or other vision-based data and may hand those inputs off to the vision-based operating system 204. The conventional operating system 302 may respond to outputs from the vision-based operating system that are in the form of suitable events or signals, such as Windows events. Thus, the conventional operating system 302 may control the vision processing system 104, aided by the facility of the vision-based operating system for handling images as inputs.

Figure 5:
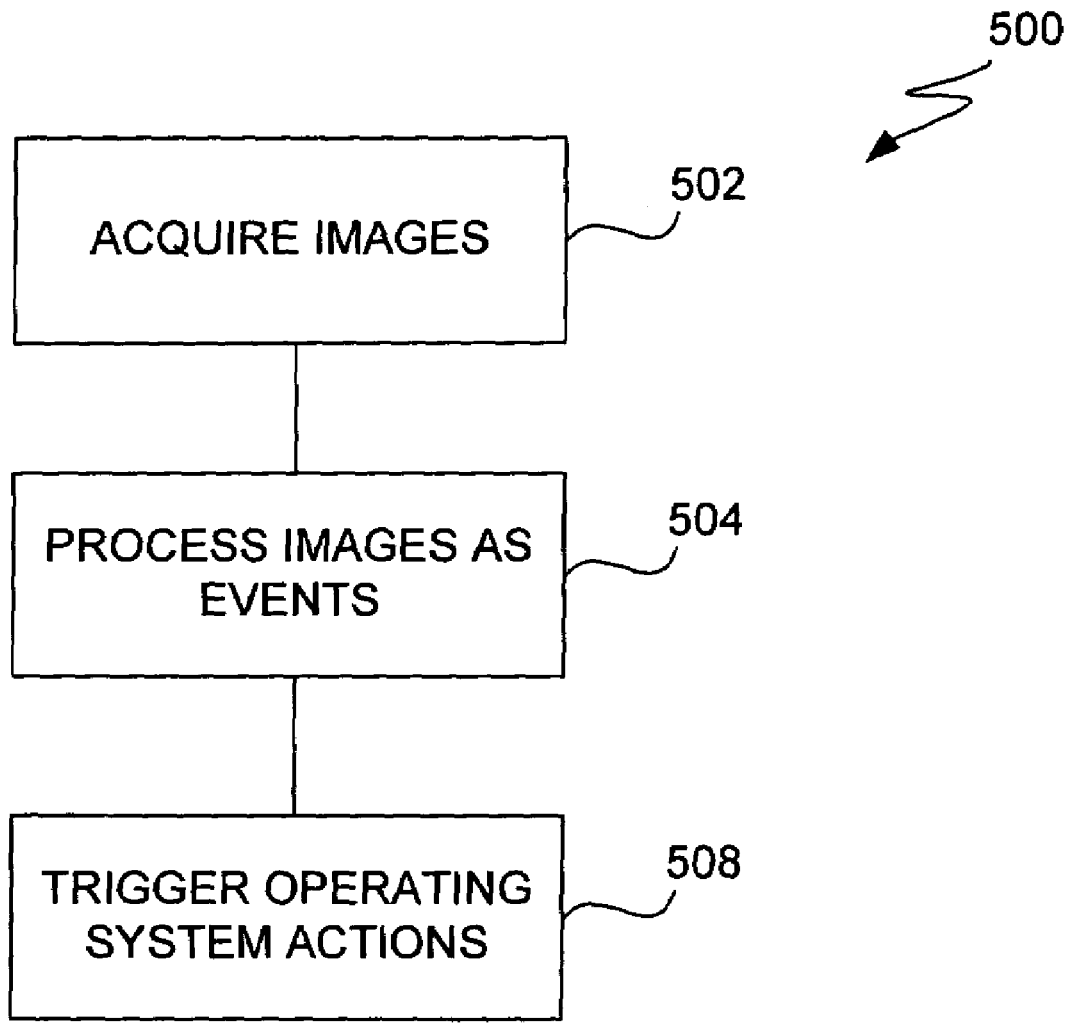
FIG. 5 is a high-level flow diagram of the processes of a vision processing system employing a vision-based operating system.

Referring to FIG. 5, a flow diagram 500 displays the high-level processes of a vision processing system 104 employing a vision-based operating system 204. At a step 502, the vision processing system 104 acquires images or image-based data. At a step 504 the vision-based operating system 204 or the image processing module 212 converts the image data into a signal that signals an event associated with the image that was input to the system. At a step 508 the vision-based operating system 204 takes an action based on the vent that is associated with the image at the preceding step.

Figure 6:
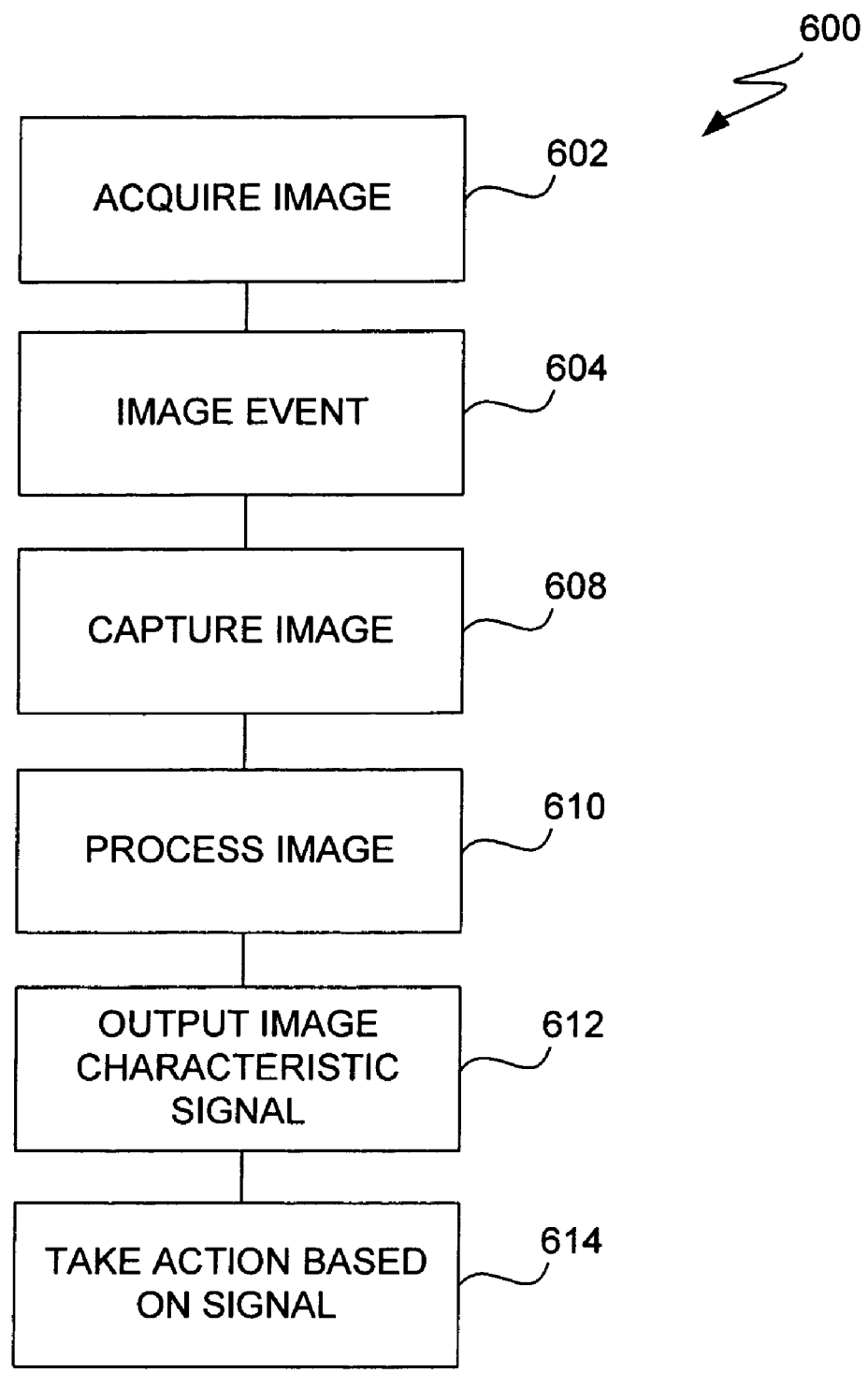
FIG. 6 is a flow diagram displaying additional processes of a vision-based processing system.

Referring to FIG. 6, a flow diagram 600 displays further processes that can be accomplished by a system 100 as disclosed herein. At a step 602, the system 100 may dispose a facility in an environment for acquiring an image, such as the camera 102. At a step 604, an image event may occur in the environment. The event may be a motion, or it may be the presence of an image having particular characteristics, such as a face or body part, or other meaningful image. The event may also be the presence of any sort of symbol in the image, such as a letter, number, word, sign or other symbol. The event may also be the absence of something from the image, such as the absence of a normally present item from the image, or the absence of motion from an image where motion is expected. Image events that can be recognized at the step 604 are without limit, and certain image events that are processed in preferred embodiments are discussed further below. Once an image event occurs at the step 604, at a step 608 it may be captured by the camera 102.

Next, at a step 610 the image may be processed by the image processing module 212 under control of the vision-based operating system 204. At a step 612, the vision-based operating system 204 may output a signal that reflects an image characteristic, as determined by the processing step 610. The output signal at the step 612 may take any form, such as an event for handling by a conventional operating system 302, a signal for controlling another device 110, a signal for controlling the camera 102, another image for further handling by the image processing module 212, or other signal or image that reflects a characteristic of the image captured at the step 608. Certain preferred embodiments of the processing step 610 are further described below. At a step 614, the system 100 may take an action based on the content of the signal that is established at the step 612.

Image events that may be processed at the step 604 may include positioning of a face in front of the camera 102, detecting motion, changing the content of the image, detecting a face in an image in a particular location, such as in a window, detecting images of a person speaking, images of body parts, such as lips, hands, or legs, images of gestures with the head, hands, fingers, or other body parts, facial features, symbols, letters, words, numbers, signs, or other images that have the potential to have contact that is meaningful for purposes of using the vision processing system 104.

At the processing step 610, a wide range of image characteristics may be analyzed. For example, the processing step 610 may determine what an object in the image is, such as whether it is a face, a person, a body part, a symbol, a sign, or other feature. Similarly, the processing step 610 may match an object in the image to another object of another image, such as matching a face image to an image of a reference face. The processing step 610 may also match another object, such as a code, to a code in a reference image. Matching may occur between codes, gestures, faces, body parts, biometric measurements, motions, signs, symbols, or other features for a variety of purpose, with the output signal at the step 612 reflecting whether or not a match occurred. The processing step may also process a characteristic of the structure of an environment, such as the presence or absence of an item in an expected place, such as a valuable item in a room that is monitored by the camera 102, or the physical condition of an item, such as a window, roof, or door, to ensure that is has not been damaged. The processing step 610 may also process characteristics of a face, such as emotions reflected by particular facial movements or positions. The processing step 610 may also process whether movement is occurring in the environment and output a signal to reflect whether any movement, or a particular movement, is occurring, such as for monitoring for movement in a secure environment, or monitoring for movement of a patient in a medical environment to ensure that the patient is occasionally moving. The processing step 610 may also process the image to determine whether any new item has appeared in the environment, and may analyze the new item to determine its nature. At the processing step 610 the system 100 may identify particular environmental features, such as smoke, fire, moisture clouds, water, or other image features that suggest that a message or alarm should be sent from the system. In embodiments, the processing step 610 may process images of children, pets, or other entities in the image and take actions based on the nature of the movements, such as proximity of a child to a dangerous item such as a stove or unmonitored swimming pool. In embodiments the processing step 610 may take actions based on a combination of any of the above or other image characteristics or events, or a combination of one or more of them with input from another device or system, such as input of a manual security code on a keypad, in combination with matching a face to a reference image for security purposes. These embodiments of a processing step 610 should be understood to be representative of the many different image characteristics that can be processed for purposes of identifying and taking further action, all of which should be understood to be encompassed in the present disclosure.

Many different types of actions can be taken at the action step 614. Examples include sending a message or other communication, turning an device or system on or off, initiating action of another device, inducing motion of or otherwise controlling in any manner the vision processing system 104, camera 102, or other device 110, allowing entry into a secure environment, opening a lock, sending an "all clear" signal, and preventing entry into an environment. Of course the action step 614 may initiate any action that can be taken by any other device 110, so the types and nature of the actions are potentially limitless.

Figure 7:
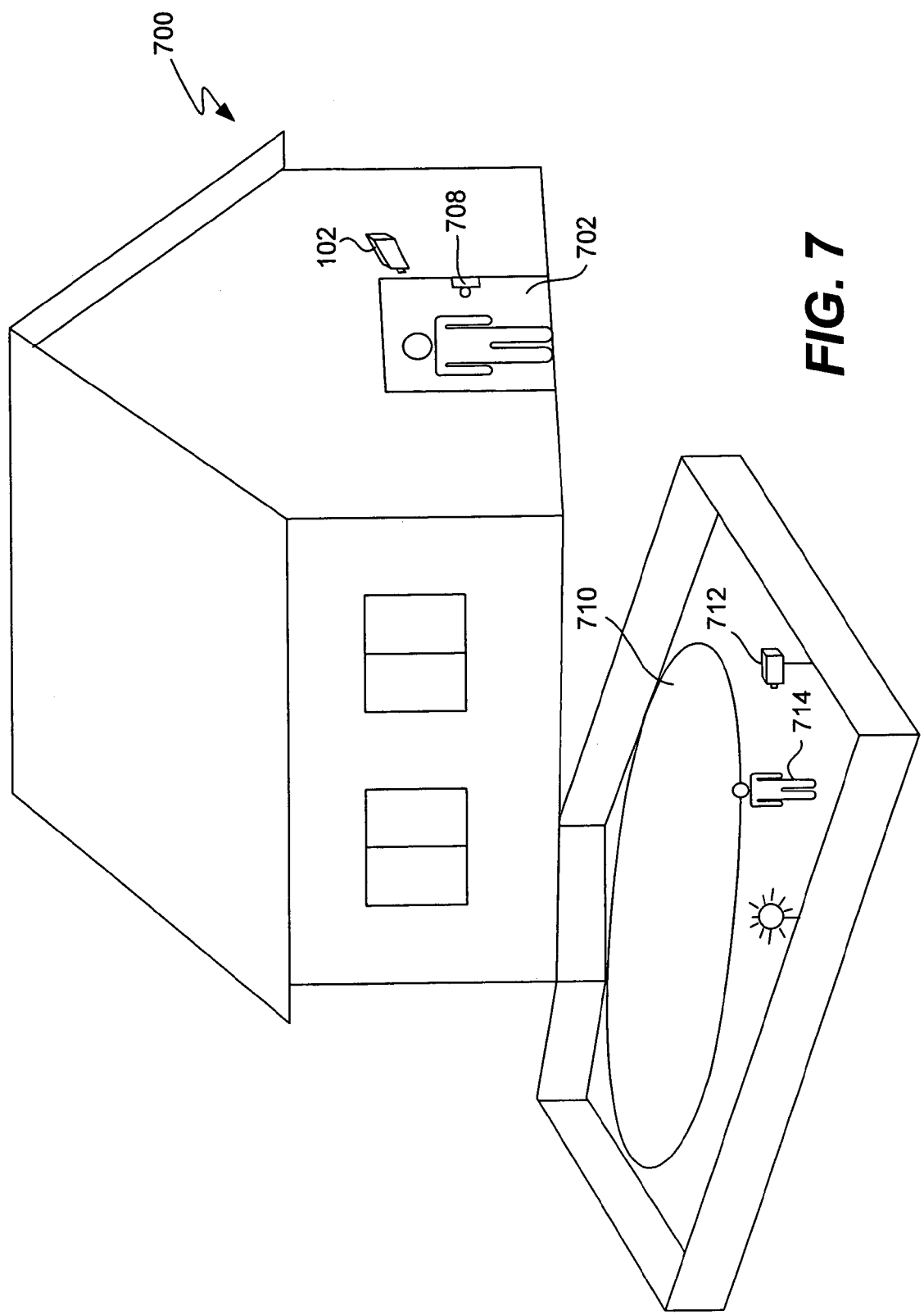
FIG. 7 depicts a home environment in which a vision-based processing system may be used.

There are many potential environments in which a vision-based processing system may be used. Referring to FIG. 7, one such environment is a home 700. Many home uses are possible. In one such use, a camera 102 may be disposed at the door 702 of the home 700, where a user 704, such as a resident of the home, may look into the camera 102 for facial recognition purposes (as described in greater detail below). The camera 102 may have an onboard vision processing system, or may be connected to a separate vision processing system 104, for determining whether an image of the user's face matches one or more reference face images stored in the data storage facility 108. If there is a match, then a lock 708 on the door 702 may release, allowing entry. In another embodiment, the home 700 may have a swimming pool 710, at which a pool camera 712 may be disposed for monitoring the pool environment. The pool camera 712 may capture an image of a child 714 and, via a vision processing system 104, trigger an alarm 718 if the child 714 comes in too close proximity to the pooi 710. Such a combination of camera and alarm could be used to alert a parent or other adult to the proximity of a child or pet to any dangerous object, such as a stove, oven, fireplace, wood stove, work bench, or the like, or to breakable items, such as china, crystal, vases, or other valuables.

Figure 8:
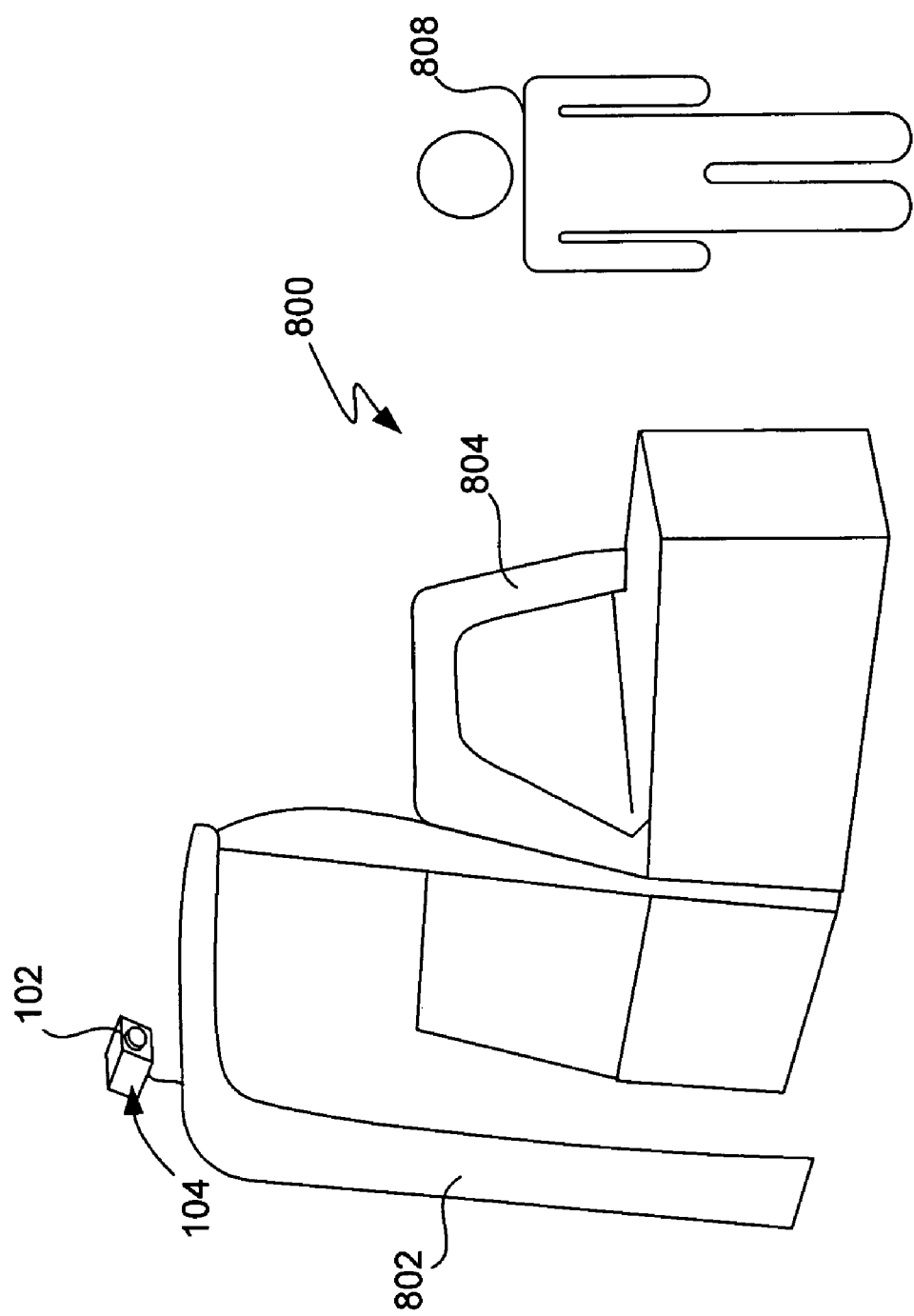
FIG. 8 depicts a transportation environment in which a vision-based processing system may be used.

Referring to FIG. 8, another environment in which a vision processing system 104 and camera 102 may be disposed is a transportation environment, such as an airline terminal security environment 800. The environment may include a metal detector 802, as well as an article-screening device 804, in both cases one of various conventional types of such devices used by airlines to screen passengers and their articles. In the environment 800 the camera 102 may capture an image of a passenger 808 and match the passenger's face image against a reference image, to confirm the identity of the passenger as a security measure. A similar system can be disposed in other transportation security environments, such as those in bus, rail and ship terminals, as well as on transportation vehicles, such as cars, buses, trucks, planes, trains, ships, boats, and the like. In one embodiment, the transportation environment may be a parking lot, and a system 100 with a camera 102 and vision processor 104 may be used to monitor images of a vehicle to ensure that it is not moved or damaged. If the image of the vehicle is altered during a predetermined period, then the system 100 may sound an alarm or send an alert, such as to the owner of the vehicle or to a security guard. The system 100 may be further equipped with a facility for recognizing the face of the owner or operator of the vehicle, so that person can enter and move the vehicle without triggering an alarm or alert. The system 100 may also be used to monitor use of a reserved parking place, so that if the face of a person parking in the spot does not match a reference image, a message is sent to the operator of the parking facility that unauthorized use of a reserved spot may be taking place.

Figure 9:
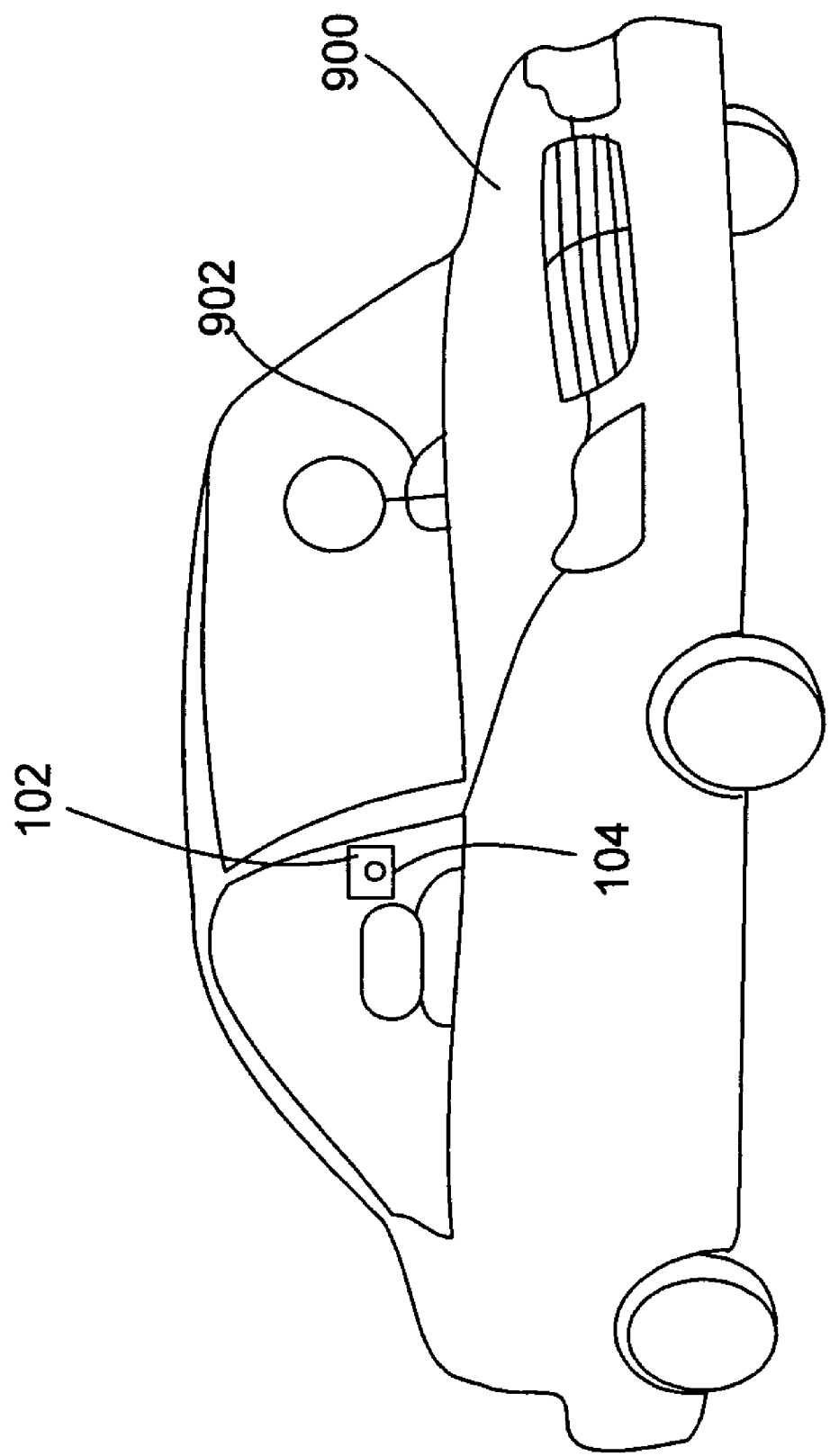
FIG. 9 depicts a vehicle environment for a vision-based processing system.

Referring to FIG. 9, another environment in which a vision processing system 104 and camera 102 may advantageously function is a vehicle, such as a car 900. The camera 102 can take an image of the face of a driver 902 and match an image against a reference database to confirm that the driver 902 is authorized to drive the car. The reference database might store data to confirm that the driver is the owner of the car, that the driver is a licensed driver, that the driver does not have moving violations or the like that restrict driving, that the driver is the person who has rented the vehicle, or the like. The vision processing system 104, upon determining a match, can take various actions, such as unlocking or locking the doors, allowing or preventing the starting of the engine, or allowing or preventing operation of other vehicle systems. Although a car 900 is shown in FIG. 9, other vehicles can use similar systems, such as boats, trucks, minivans, taxis, buses, ships, planes, jets, scooters, motorcycles, or the like.

Figure 10:
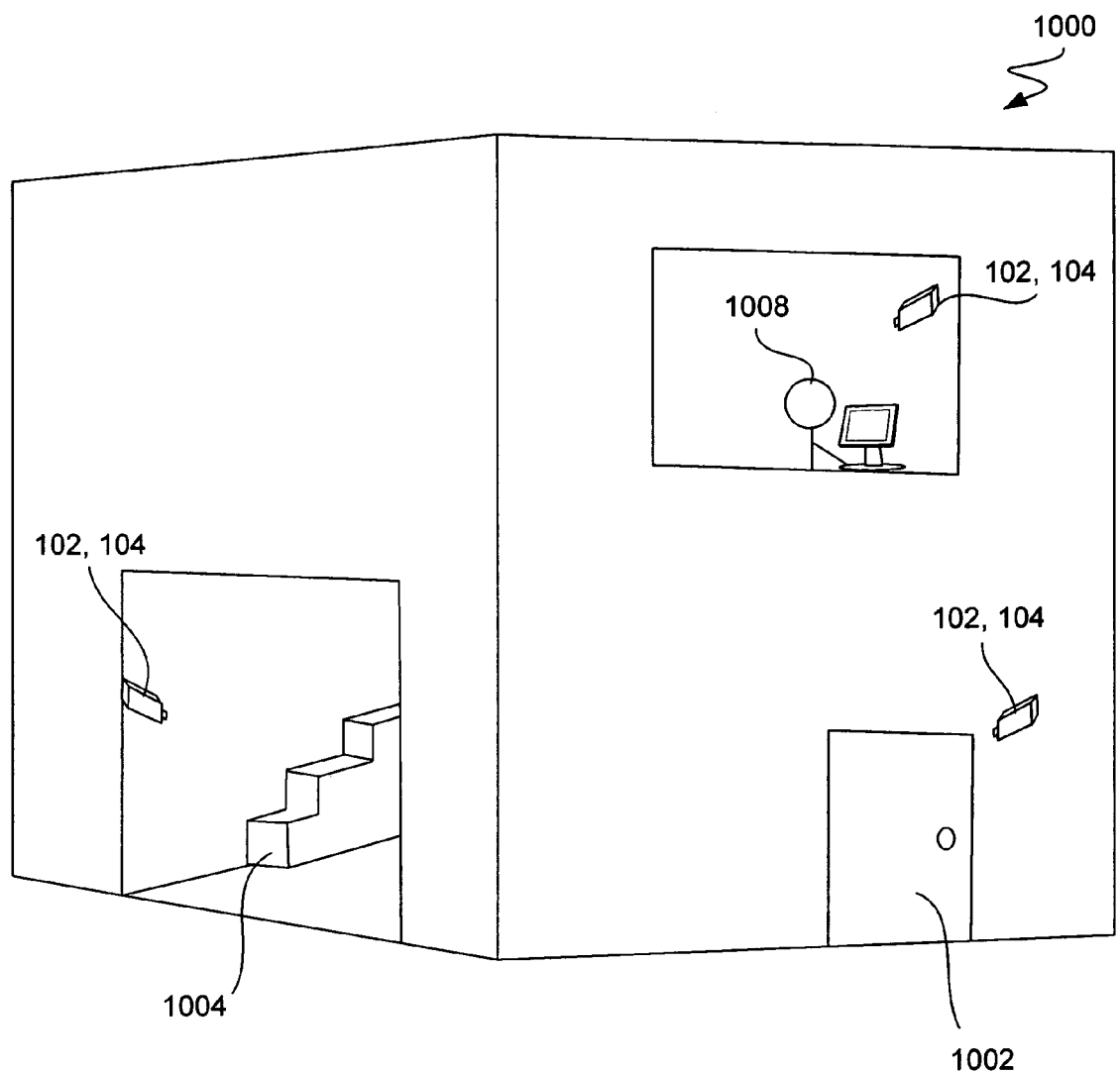
FIG. 10 depicts a building environment for a vision-based processing system.

Referring to FIG. 10, another environment is a building 1000, such as an office building, workplace, or similar environment. As with a home, a camera 102 and vision processing system 104 may be used to provide security access at a door 1002 at the exterior or interior of the building 1000. Similarly, a camera 102 and vision processor 104 may be used to monitor one or more items in the building 1000, such as to prevent their being stolen, or to monitor their location within the building. For example, the vision processing system 104 may determine the location of items of inventory in a warehouse based on their image shapes, or based on codes or images, such as brands or logos, located on the items. The vision processing system 104 can then interact with another computer system, such as an inventory control system. In another embodiment, a camera 102 and vision processing system 104 can be used to monitor actions of a person 1008, such as for security purposes to ensure that the person is conscious and has not been harmed, or for other purposes, such as to determine whether or not certain actions have occurred, perhaps as a precondition to taking a further action. For example, the system 100 could determine when an item whose image is matched to a reference image in a database has arrived from a pre-processing location to a location for further processing and then send a message to the user 1008 that the item is ready. Many other workplace uses of a vision-based operating system 204 in a vision processing system 104 can be envisioned and should be understood to be encompassed herein.

Figure 11:
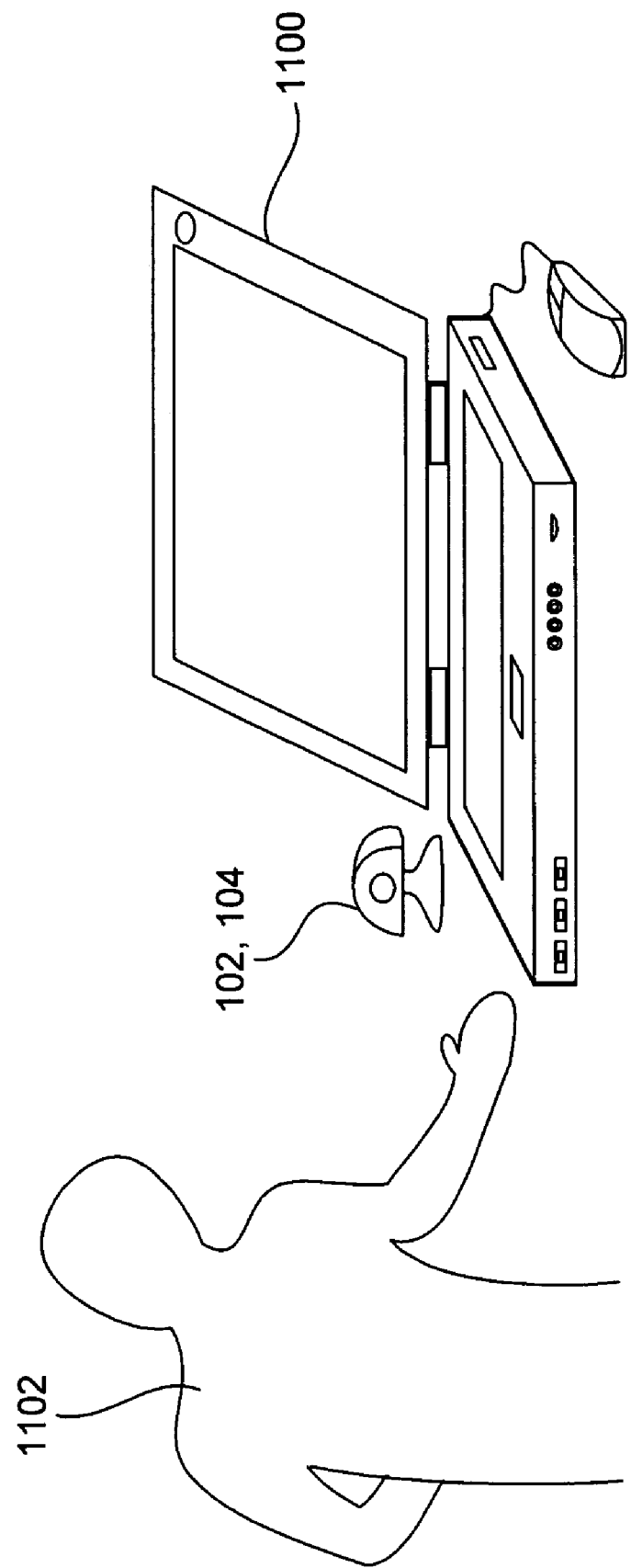
FIG. 11 depicts a computer environment for a vision-based processing system.

Referring to FIG. 11, a camera 102 and vision processing system 104 may be used in an environment that contains a computer 1100, such as a personal computer, laptop computer, personal digital assistant, handheld computer, or the like. The camera 102 may capture images in the environment of the computer 1100, such as images of a user 1102. The vision processing system 104, which may be on board the camera 102, the computer 1100, or another computer system that is external to both, can process images taken by the camera 102, such as images of the user 1102. For example, the vision processing system 104 may match the face of the user 1102 against a set of reference images to confirm the identity of the user 1102. Thus, the system can be used for security purposes in lieu of or in addition to other security measures, such as passwords. In an embodiment, the computer 1100 may be used by the user 1102 to interact with a site, such as an Internet site, such as for e-commerce, game, research, or entertainment purposes. In an e-commerce use, the user 1102 may use the vision processing system 104 to confirm the user's identity, to ensure the security of an e-commerce transaction, such as use of a credit card to purchase goods or services online.

Figure 12:
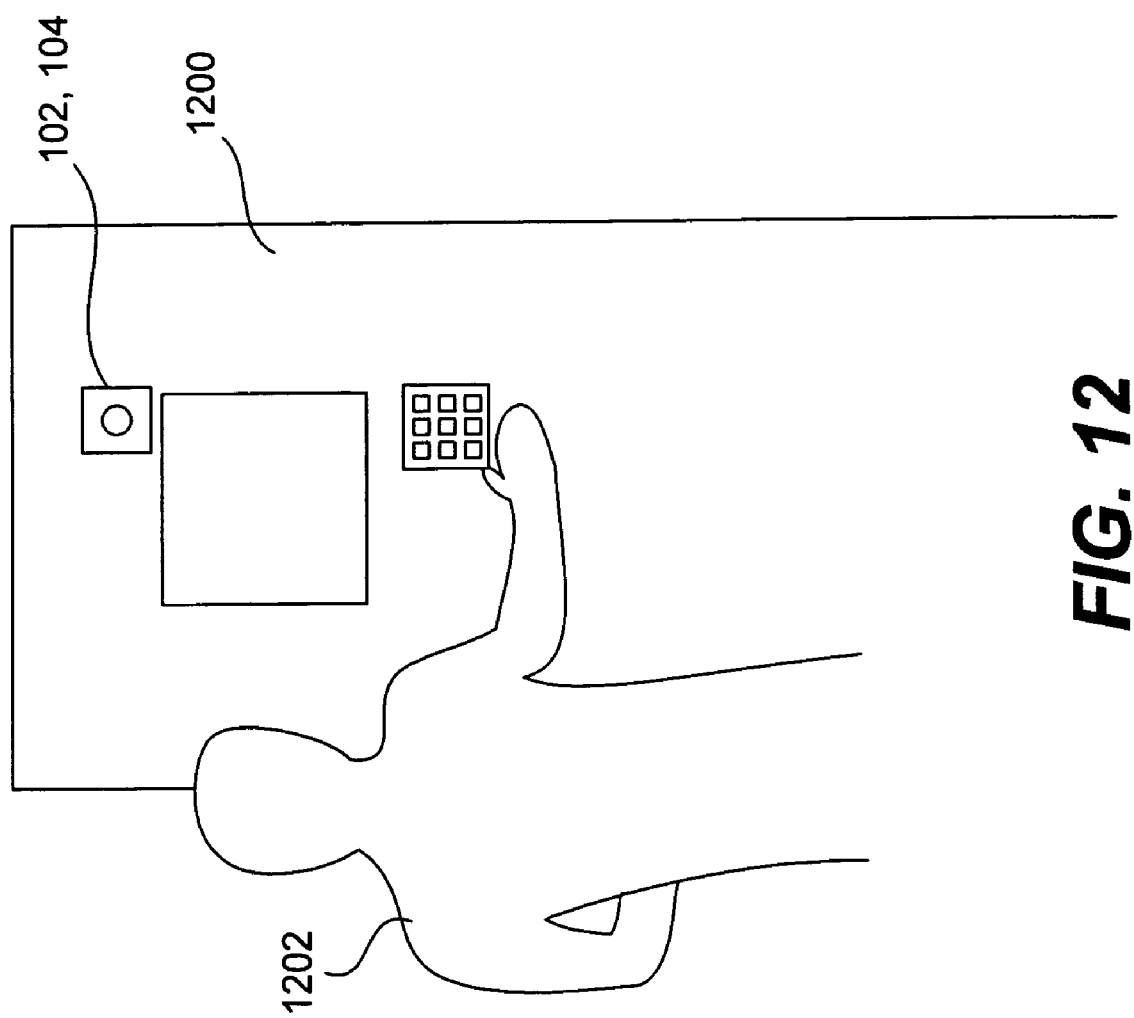
FIG. 12 depicts a secure storage environment for a vision-based processing system.

Referring to FIG. 12, in another embodiment the camera 102 and vision processing system 104 of a system 100 may be disposed in an environment that provides secure storage, such as for cash or other valuables, such as an automated teller machine (ATM) 1200. The system 100 can then be used to verify the identify of a user 1202 before permitting a transaction, such as withdrawal of cash, checking an account balance, or making a transfer from an account. Similarly, the system 100 can be used to provide identity verification for safe deposit withdrawals, withdrawal of valuables from a safe, or removal of items from a locked storage facility of any size. In embodiments, the system 100 may provide both an identity verification function and a separate function, such as monitoring images of items that are secured in the facility to ensure that they have not been removed, moved, or damaged.

Figure 13:
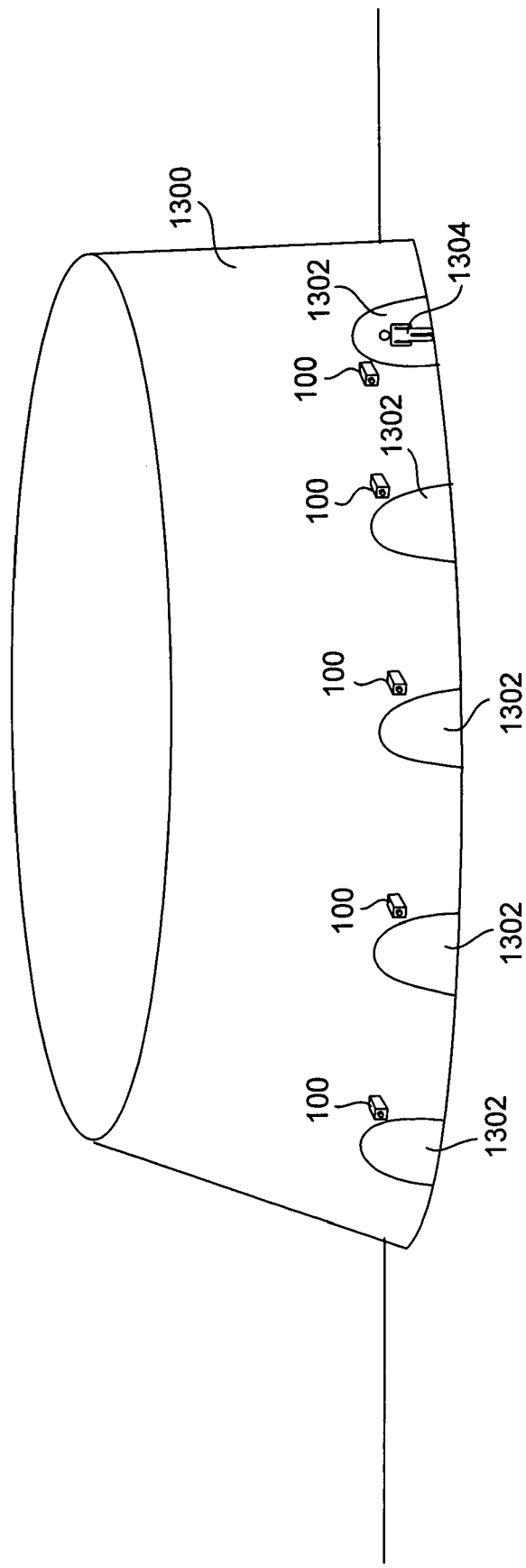
FIG. 13 depicts a venue environment for a vision-based processing system.

Referring to FIG. 13, a system 100 comprising a camera 102 and vision processing system 104 can also be disposed in an environment that includes a venue 1300 that includes a gate 1302 or similar facility for restricting access to the venue 1300. The venue 1300 may have a central computer system, or computing functions may be included at the gate with each system 100. The system 100 may access a reference database of images for the purpose of matching an image taken by the camera 102, to ensure that a user 1304 seeking access to the venue 1300 is an authorized user, such as confirming that the user 1304 bought a ticket to an event at the venue, or the user 1304 is an employee or authorized contractor entitled to enter the venue. Many different venues can be envisioned, such as sporting event venues, such as football, basketball, soccer, hockey, baseball, and golf venues, performance venues, such as movie theatres, playhouses, event centers, concert venues, and opera houses, accommodation venues, such as hotels, motels, casinos, bars, convention centers, and restaurants, and many others.

Figure 14:
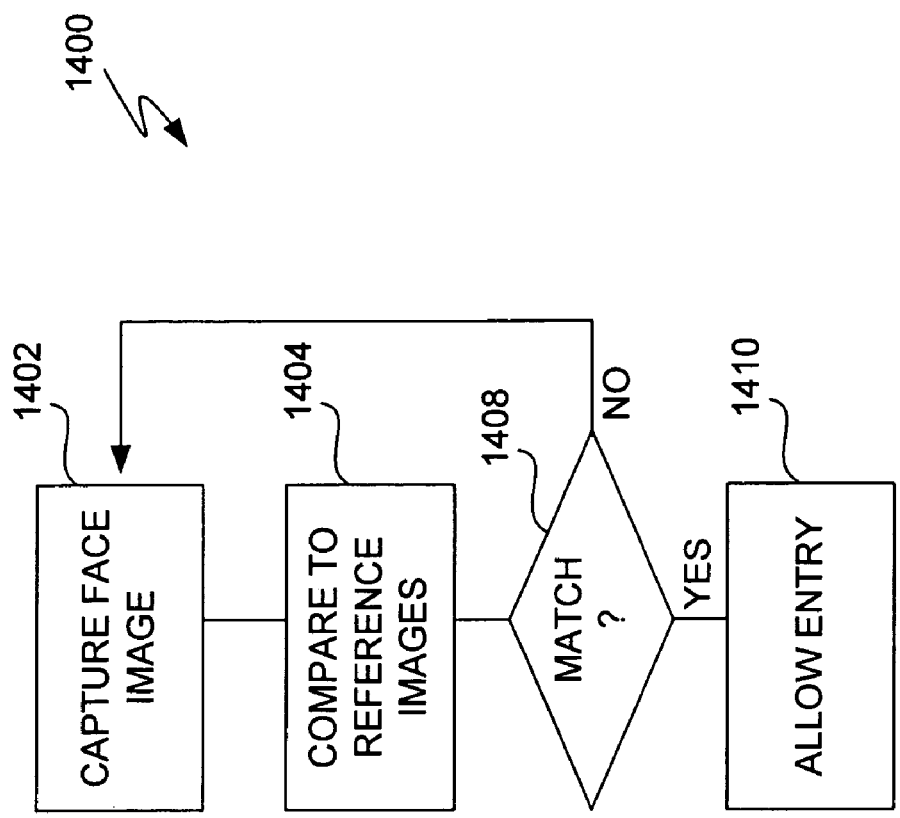
FIG. 14 is a flow diagram depicting high-level steps for use of a vision-based processing system to secure entry into a home.

Referring to FIG. 14, a flow diagram 1400 shows high-level steps for an embodiment of the invention where a system 100 is used to secure entry into an environment such as a home. At a step 1402 the system 100 can capture an image of a face (or other identifiable characteristic) of the user. Next, at a step 1404 the system can compare the image to one or more reference images stored in a data facility. Next, at a step 1408 the system can determine whether the images match (as described in much greater detail below). If not, then the system can try again by returning to the image capture step 1402. If there is a match, then at a step 1410 the system can allow entry into the environment.

Figure 15:
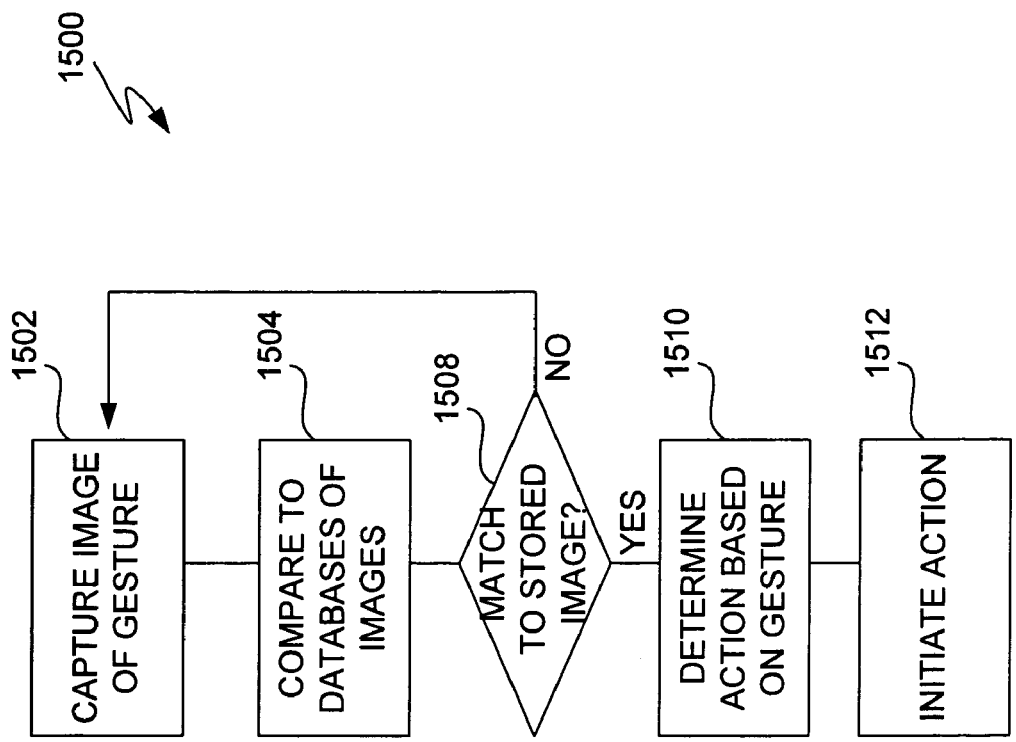
FIG. 15 is a flow diagram depicting high-level steps for using a vision-based processing system to process images of gestures.

Referring to FIG. 15, a flow diagram 1500 shows steps for an embodiment of the invention in which a vision processing system 104 processes images from a camera 102 for purposes of identifying and acting on gestures that are captured in the images. At a step 1502, the camera 102 captures an image that potentially includes a gesture and relays it to the vision processing system 104. At a step 1504 the image processing module 212 of the vision processing system 104 compares the captured image to a database of images of gestures to determine whether the captured image contains a gesture that matches a stored gesture. Next, at a step 1508, the image processing module 212 determines whether a match has occurred. If not, then processing returns to the step 1502 for further capturing of images. If there is a match at the step 1508, then at a step 1510 the system determines what gesture has been matched, and what action is appropriate, by reference to stored rules that relate each gesture or series of gestures to related actions. Next, at a step 1510, the system initiates an action based on the identified gesture. In some cases, the action may be to wait for a further gesture, so that the system can act based on combinations of gestures, as well as upon single gestures. By way of example, the system could monitor a patient and trigger a query asking if the patient is ok. If the patient gestures with a "thumbs up" gesture, then the system can send a message to a care provider that the patient is ok. Similarly, the system can capture a gesture, such as waving hands, to indicate that an alarm or alert should be triggered. By creating a complete set of rules, it is possible for a vision processing system 104 to initiate any actions that would otherwise be triggered by keypad, mouse, or voice entry. Thus, the vision processing system 104 can, through gesture control, replace or supplement a conventional computer operating system.

Figure 16:
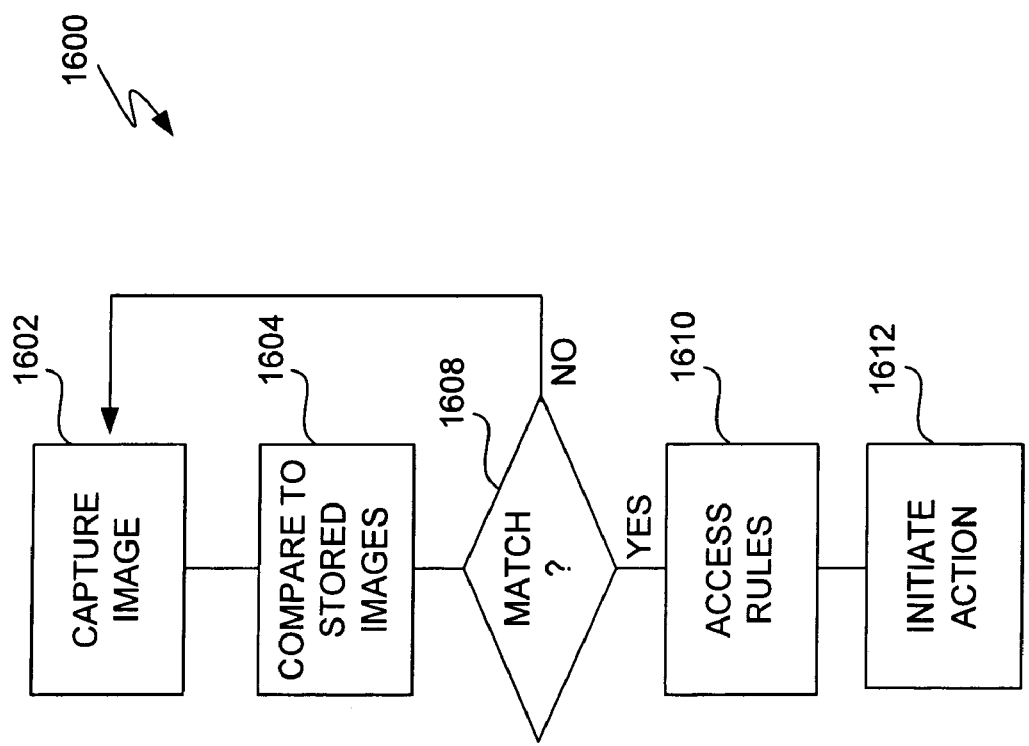
FIG. 16 is a flow diagram depicting steps for using a vision-based processing system to monitor an environment.

Referring to FIG. 16, a flow diagram 1600 indicates high-level steps for using a system 100 to monitor an environment in order to trigger an appropriate action. At a step 1602, the system captures an image of the environment. Next, at a step 1604, the system compares the image that was captured to a database of reference images to determine whether a match occurs. If, at a step 1608 a match does not occur, processing returns to the step 1602 for further image capture. If a match occurs at the step 1608, then the system can, at a step 1610, access a plurality of rules that determine what action should be taken in response to the identification of the image. Then, a step 1612, the system can initiate an action based on the rules. Examples of images that can be matched include images that show motion, images that show proximity of motion to a particular item, images that have unique characteristics, such as smoke, fire, or water, images that show proximity of two items to each other (such as for prevention of collisions), absence of motion, and the like. When one of these items is matched, the rules can then determine the action. For example, if smoke, fire, or water is detected where it is abnormal, then an alarm or message may be sent to an operator or to an emergency service. If two items (such as two boats) are coming in too close proximity, then an alarm can be sounded to an operator. If a child is too close to pool or stove, then an alarm can be sounded and a message sent to a parent. If an item is missing from an image, then an alert can be sent to a security guard or other person responsible for monitoring the item. Thus, by matching images and triggering rules, the system can provide monitoring of any environment for a wide range of purposes.

Figure 17:
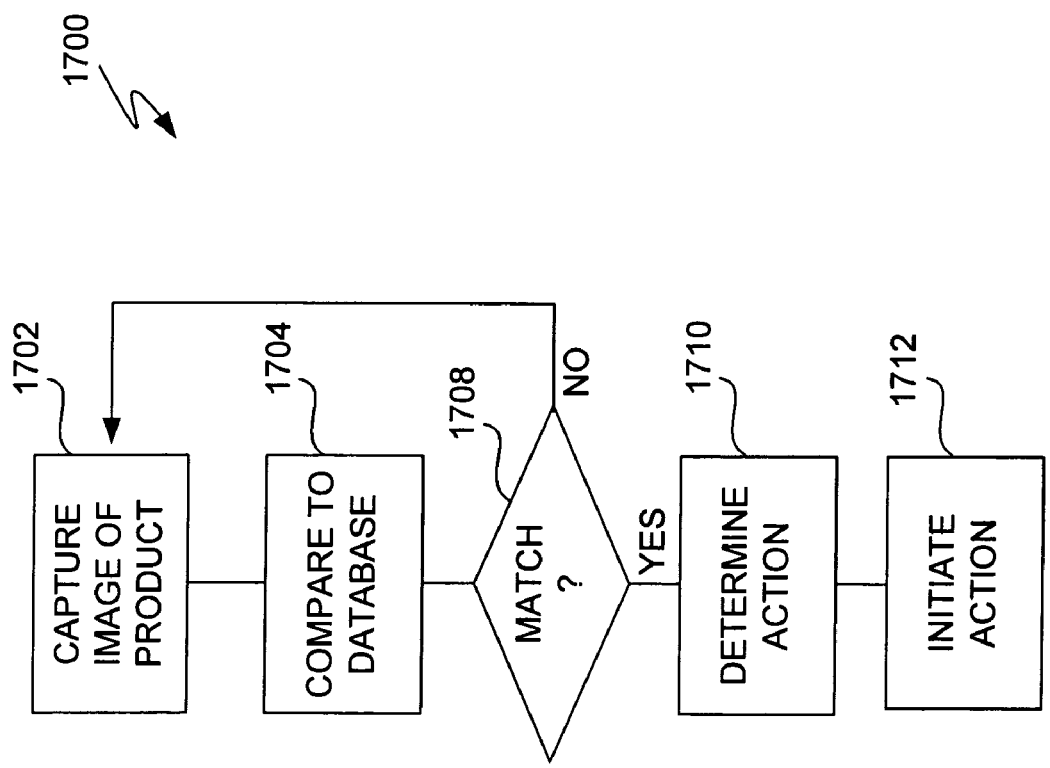
FIG. 17 is a flow diagram depicting steps for using a vision-based processing system for product recognition.

Referring to FIG. 17, a flow diagram 1700 shows the high-level steps for use of the invention in an embodiment used for product recognition. At a step 1702 the camera 102 may be used to capture an image of a product, such as in a warehouse for inventory control purposes or at a retail counter, for pricing purposes. Then at a step 1704 the image of the product can be compared to images stored in a data facility. At a step 1708 the system can determine whether a match has occurred. If not, then the system can return to the step 1702 and continue attempting to find a match. If so, then at a step 1710 the system can determine the nature of the product of which an image was captured and consult a set of rules that are stored for that product to determine an action. For example, the system can determine that the item is a box of a particular brand of cereal, and it can retrieve the price of that box of cereal pursuant to the rules for retrieving prices. Next, at a step 1712 the system can initiate an action based on the determination of the image, such as charging the price for the box of cereal, or storing an indication that a particular item is in a particular location.

Further details will now be provided as to a system for matching a face to confirm the identity of a user of the system 100, such as for allowing entry into a home via a home security system. As depicted in FIG. 7, a system 100 can be used at a door 702 or entryway to control access via a lock 708 or similar mechanism into a home 700. As depicted in the flow diagram 1400 of FIG. 14, the system can be used to match a face against one or more reference images in a data facility. As in FIG. 1, a face matching system may have similar components to a more general vision processing system 100, such as a camera 102, a vision processing system 104, a data facility 108, and an optional other system 110, such as a system for electronically opening a lock.

Figure 18:
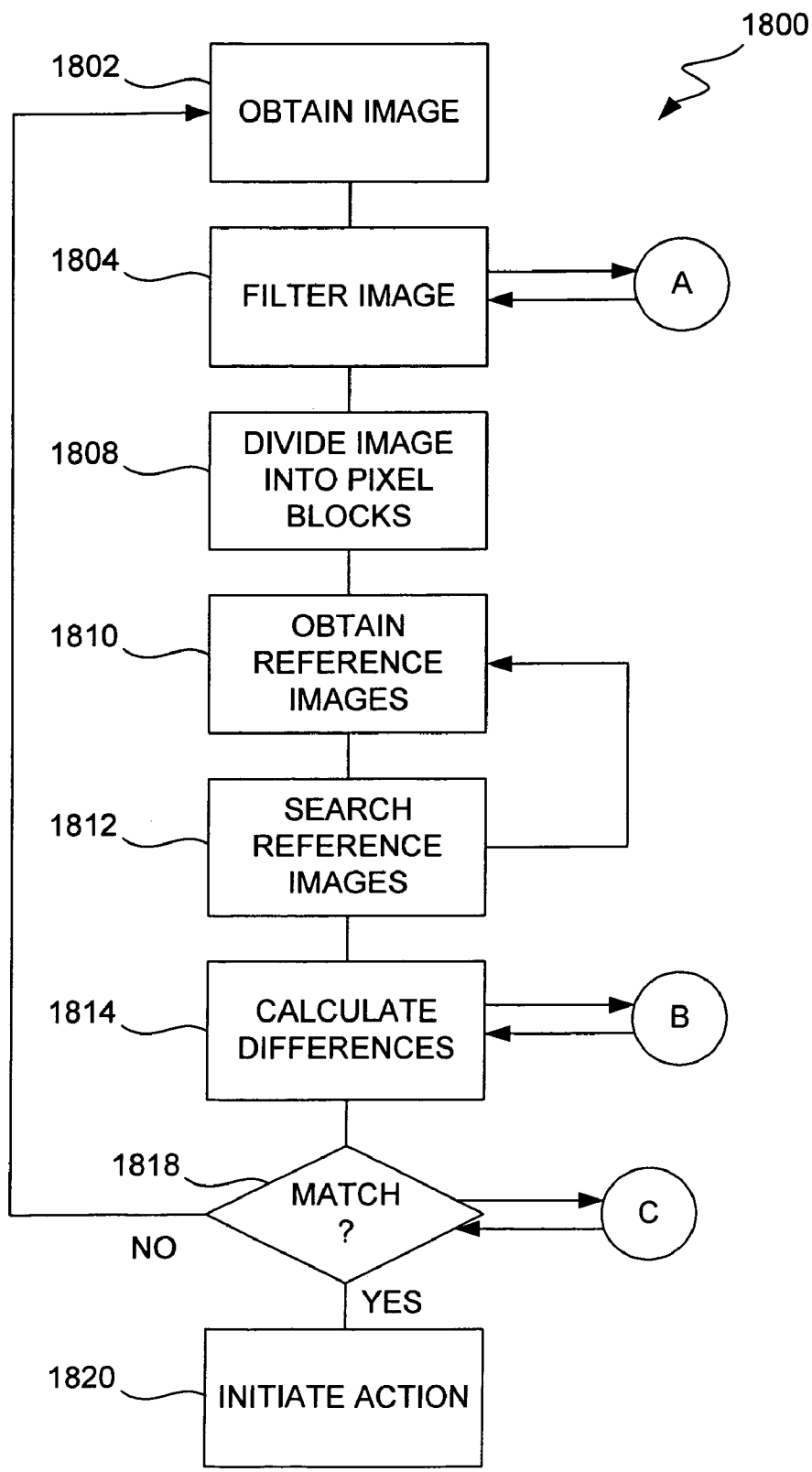
FIG. 18 is a flow diagram depicting steps for using a vision-based processing system to match an image of a face to a reference image.

Referring to FIG. 18, a flow diagram 1800 discloses steps for an embodiment of a face matching system. First, at a step 1802 the system obtains an image of a face, such as by the user placing his or her face in front of the camera 102. Next at a step 1804, the image processing module 212 of the vision processing system 104 filters the initial image to obtain a filtered image that is more suitable for matching purposes. Further details of the filtering step are disclosed in a flow diagram 1900 of FIG. 19, which is connected to FIG. 18 by off-page connector "A". The filtering step breaks down the image into a matrix of pixels, then averages the luminance of neighboring pixels about each pixel, then divides the image into pixels based on whether the average about a given pixel exceeds a binary threshold. Once an image is filtered at the step 1804, additional steps of a matching process take place. At a step 1808 the system may divide the filtered image into a plurality of pixel groups or blocks. The step 1808 may include an optional pre-processing step of normalizing the image, such as locating the eyes or other features of the face in the same location as the eyes of a reference image. In an image of columns and rows or lines, it is possible to divide it into blocks, for example into square blocks of dimension n. The number of such blocks is the product of two factors, the number of columns divided by n and the number of lines divided by n. We can consider such squares centered on the pixel (i,j) where i is between 0 and Column and j is between 0 and Lines, and both are integer multiples of n. Next, at a step 1810, the system obtains reference images from the data facility 108, which may be stored locally or at a remote host. Next, at a step 1812 the system searches a first reference image. The steps 1810 and 1812 can be repeated in sequence on in parallel for an arbitrarily large number of reference images. For example, there may be different images stored showing a user in different conditions, such as with a tan, without a tan, or the like. Next, at a step 1814 the system applies one or more algorithms, discussed in greater detail below, to determine differences between the captured image and a reference image. The additional steps are disclosed in connection with FIG. 22, which is connected to the flow diagram 1800 by off-page connector "B." Once the differences are calculated at the step 1814, at a step 1818, it is determined whether there is a match. The steps for assessing and determining a match are disclosed in greater detail in connection with FIG. 23, which is connected to the flow diagram 1800 by off-page connector "C". Once a match has been determined, the system can initiate actions at a step 1820, which may include allowing access to a facility, and which may optionally include storing the newly captured image in the reference database for future matching purposes. If there is no match, then the system can repeat the above steps. Because the threshold for a match can be made arbitrarily difficult, the probability of a false positive match can also be made arbitrarily low, so that it is appropriate to allow multiple, and even unlimited, attempts to match, unlike many conventional systems that must prevent large numbers of attempts because of the increasing probability of a false match that would allow improper access.

Figure 19:
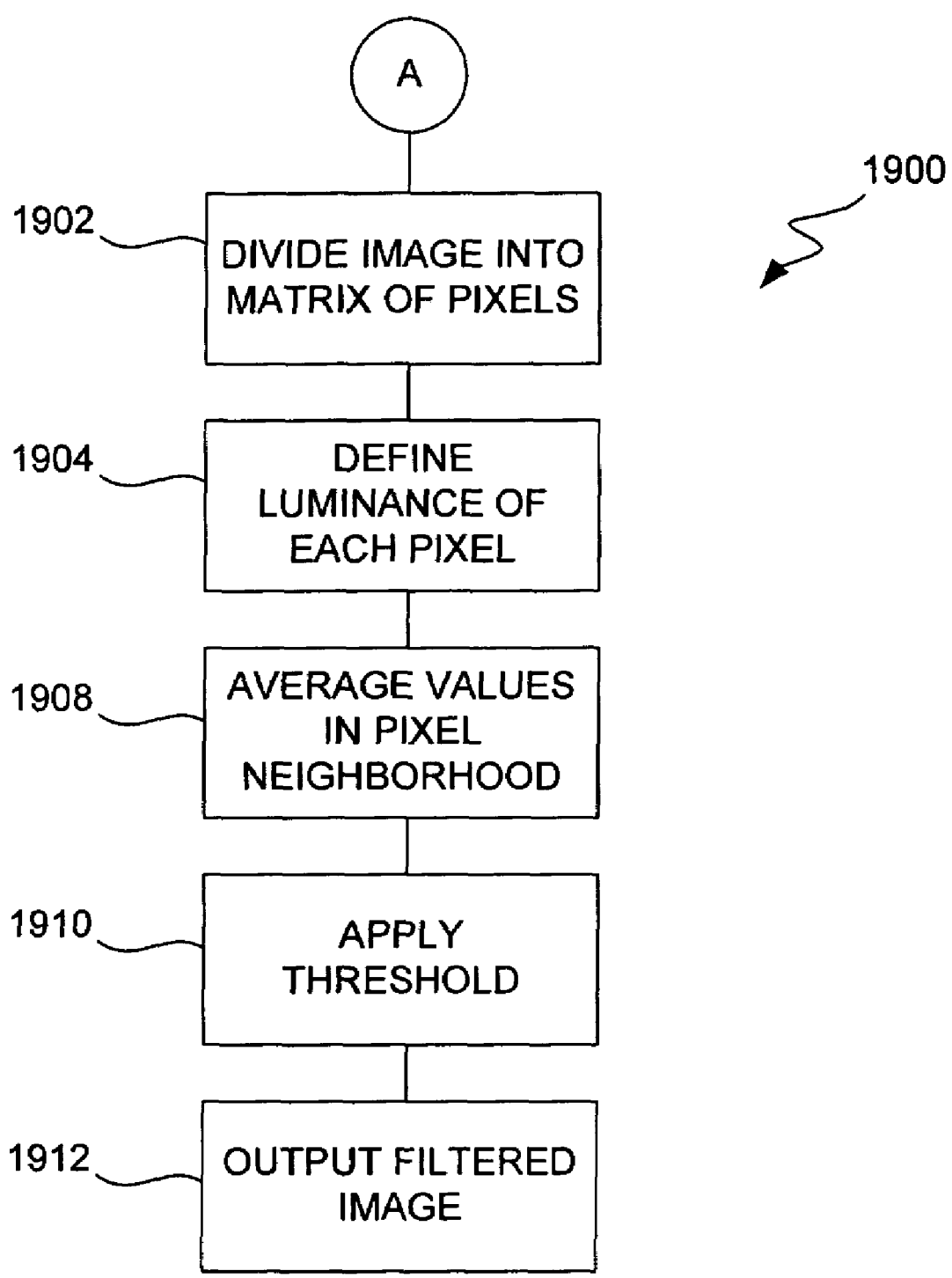
FIG. 19 is a flow diagram depicting steps of an image filtering process of a face matching process of FIG. 18.

Referring to FIG. 19, a flow diagram 1900, connected via off-page connector "A" to the flow diagram 1800 of FIG. 18, discloses steps for accomplishing the filtering of the image at the step 1804 of FIG. 18. First, at a step 1902, to describe an image mathematically, one can consider it as a matrix of pixels $p_{i,j}$. A pixel is a superposition of colors, usually the three colors red, blue, green, so one can take each $p_{i,j}$ as an element of vector space $R^3$. The three components of this pixel represent the decomposition of a color according to this base of colors. For simplicity one can ignore the discrete character of each component and consider that every nuance of every color is allowed. Thus, an image of n lines and p column can be described as a matrix $A \in M_{np}(R^3)$.

Next, it is possible at a step 1904 to define luminance L of each pixel as a linear function from $R^3$ to R, for example: $L:(r,g,b) \to 0.3\ r + 0.59\ g + 0.11\ b$. Next, at a step 1908, one can define an average value of a pixel based on the luminance of surrounding pixels. For example, one can define Average as a function of a neighborhood of a pixel $p_{i,j}$ and give the arithmetical average of the luminance of all the pixels $(p_{k,l})$ with $i-r \leq k \leq i+r$ and $j-r \leq l \leq j+r$ as set out below.

$$\text{That is: Average}(i, j, r) = \frac{\sum_{k=i-r}^{i+r} \sum_{l=j-r}^{j+r} L(p_{k,l})}{(2r+1)^2}$$

Many other functions may fulfill the same role as this one, such as many kinds of discrete convolutions of the function L, or even non-linear or other functions. Next, one can apply a filter to the pixels, based on the average of the neighborhood of the pixel. Thus, at a step 1910, one can define the filter, which is a binary flag on the value of Average:

$$\text{Filter}(i, j, r, \text{threshold}) = \begin{cases} 1 & \text{if Average}(i, j, r) - L(p_{i,j}) > \text{threshold} \\ 0 & \text{if Average}(i, j, r) - L(p_{i,j}) \leq \text{threshold} \end{cases}$$

Thus, a plurality of pixels of varying color and luminance can be converted into a black and white image defined by pixels of value one and zero, with the one and zero value being established by whether or not surrounding pixels have a luminance above a given threshold or not. At a step 1910, the system can output a filtered image. The filter makes contrasts in the image more drastic, allowing for better matching of important facial characteristics, such as scars, moles, and the like. Referring to FIGS. 20 and 21, an image of a face can be seen before (FIG. 20) and after (FIG. 21) the application of a filtering process such as that disclosed in connection with FIG. 19.

Figure 22:
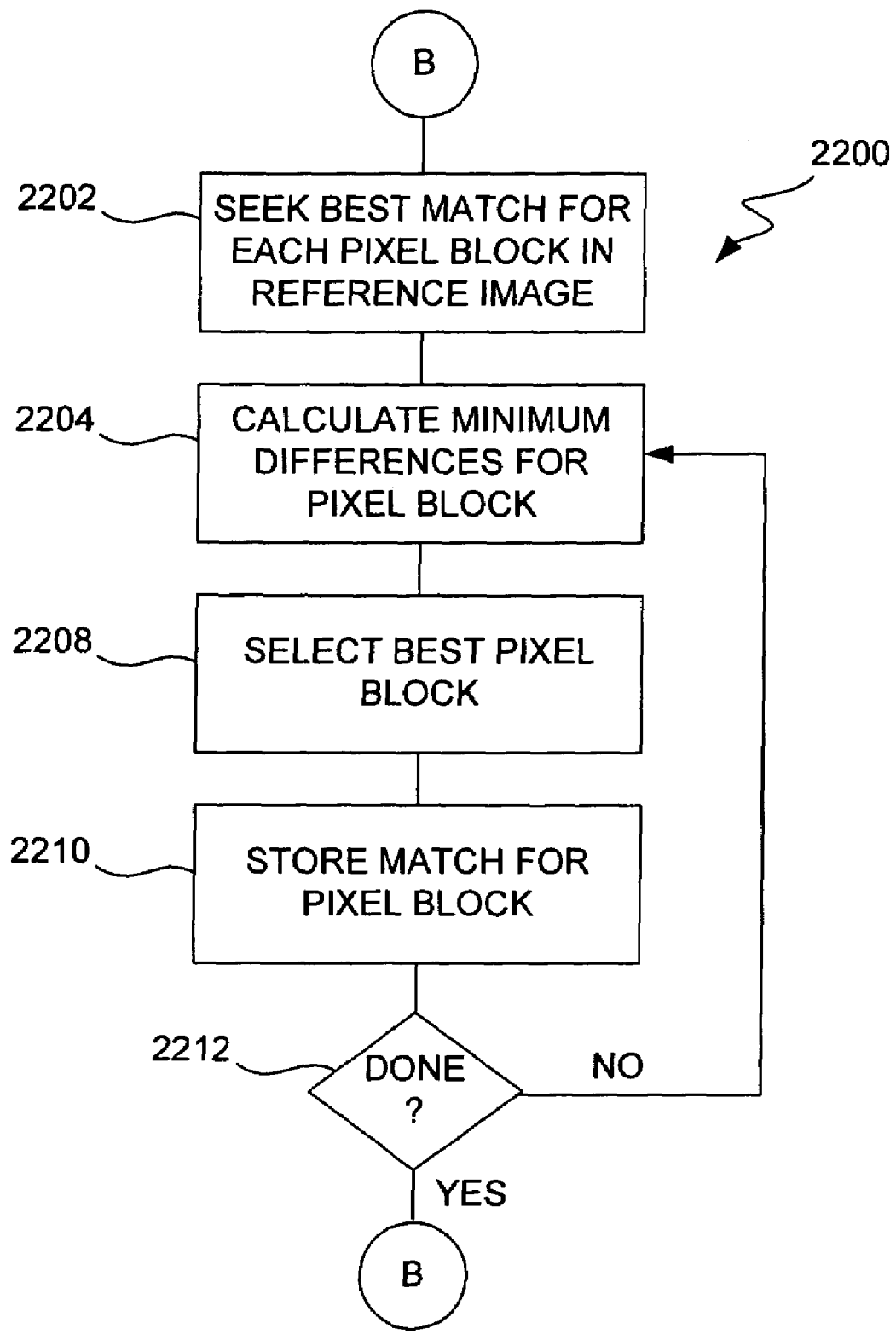
FIG. 22 is a flow diagram depicting steps for comparing a face image to a reference image.

Referring to FIG. 22, steps for making a comparison between an acquired image and a reference image are further disclosed in a flow diagram 2200 that is connected to the flow diagram 1800 of FIG. 18 by off-page connector "B". In the following we will give the index 1 to the quantities related to the reference image, the index 2 will be for the acquired image. Referring to the two images, I1 and I2, they have been divided in the same format Column×Lines. The images have already been normalized the images in a way that, for example, the position of the eyes is the same in both, located in a standard pattern. Both have been filtered, such as by the steps of the flow diagram 1900 of FIG. 19, into two binary images of substantially the same size. In essence the comparison of the images can be understood as an error function to judge, for two square blocks of the two images, how different they are. In all the following, it is assumed that one has chosen a format of a square block of dimension n. At the step 1808 of the flow diagram 1800 the first image was already divided into pixel square blocks, which are totally separated. There are Column/n*Lines/n such square blocks. Each square can be designed by $B_{i1,j1}$ centered on the pixel (i1, j1) where i1 is between 0 and Column and j1 is between 0 and Lines, and both i1 and j1 are integer multiples of n. It should be noted that the methods described herein work with other block shapes, such a circles, rectangles and the like. Use of square blocks is indicated herein for simplicity of explanation.

At a step 2202, we initiate the computation, starting by computing for each square block of the first image what is the best fit in the second image, according to some error function. At a step 2204 we calculate for the first pixel block in the acquired image an error function that consists of the sum of the square of the differences between the pixels of that pixel block and the pixels of each of the possible pixel blocks in each of the reference image. The pixel block of the reference image is selected at the step 2208 as the "best" match for that pixel block. Then, at a step 2210, the system stores the location of the best matching pixel block from the reference image for the pixel block at hand. Then at a step 2212, the system determines whether there are additional pixel blocks to analyze. If so, then the steps are 2204 through 2210 are repeated until every pixel block has an identified best match, with a known location, in the reference image. When done, processing returns to the flow diagram 1800, as indicated by off-page connector B.

Determining the best fit at the step 2208 can be accomplished by a variety of techniques, including minimizing the sum of the differences, least squares, and other similar difference-calculating functions. When the process is complete, one can identify in the second image a block centered in $(i_2,j_2)$ that best corresponds to the block $B_{i1,j1}$ centered in $(i_1,j_1)$ in the first image. This block is the 'global best fit' of $B_{i1,j1}$.

Figure 23:
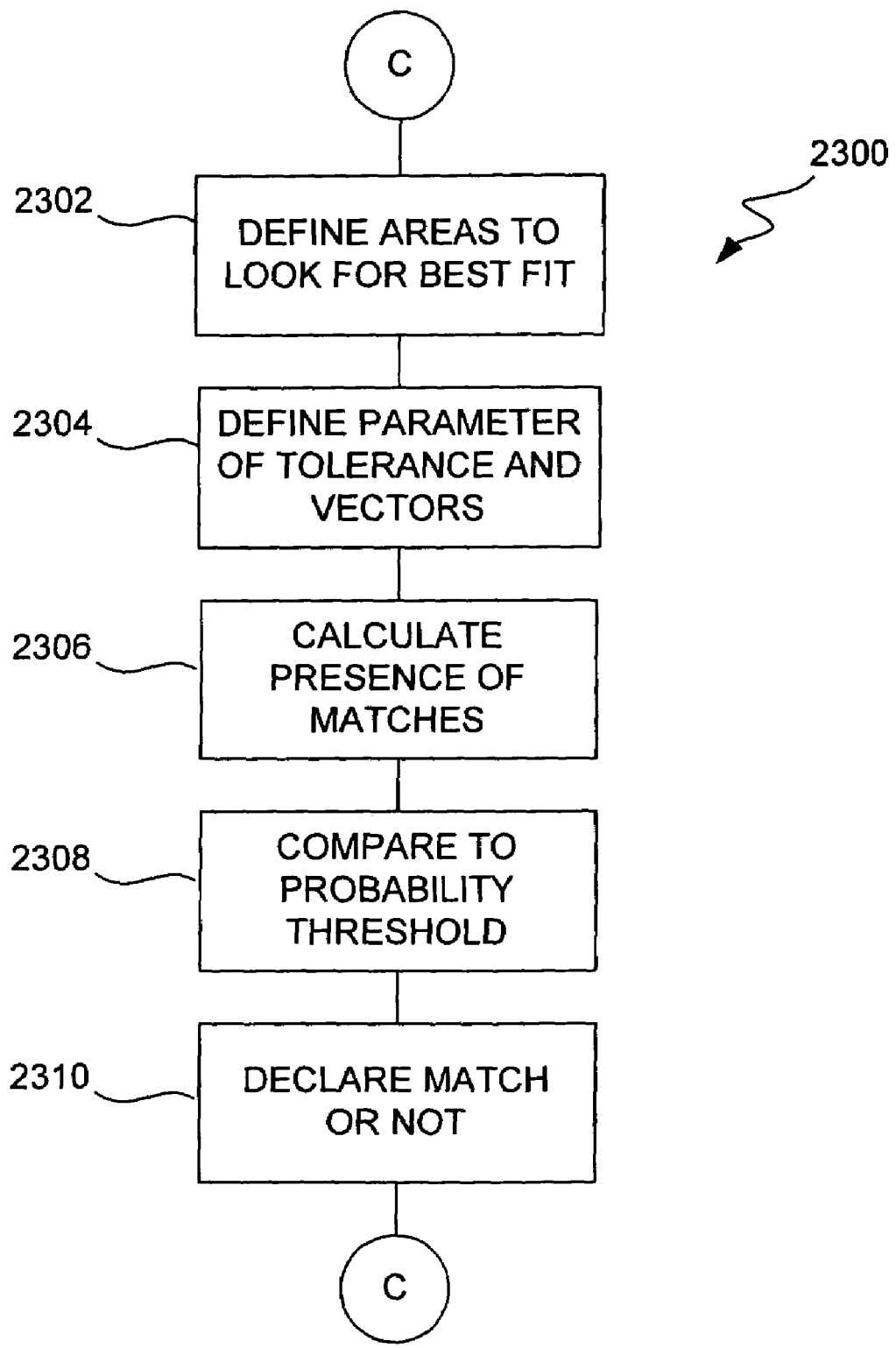
FIG. 23 depicts steps by which confirmation is obtained whether a face image matches a reference image.

Referring to FIG. 23, a flow diagram 2300 depicts steps by which it may be assessed whether a first image captured by the camera 102 matches a second image retrieved from the data storage facility 108. The processes of FIG. 23 may be carried out by the image processing module 212 under control of the vision-based processor 204.

The matching process depicted in FIG. 23 takes advantage of the principle of continuity, and in particular the special continuity of the face images to be matched. Generally, when one compares two images of the same face, if one has localized in both some particular point—that one can name M1 in the first image and M2 in the second one-, one can predict that a detail N1 that is just at the right of M1—in the first image—should correspond to a point N2 just at the right of M2 in the second image. Thus, one expects the relative position of Ni with respect to Mi to be the same, or almost the same, in both pictures. (One might have in mind that the two pictures are approximately deduced from each other by translating the image somehow). If there is doubt about the correspondence of the point Mi's in the two images, the belief that the images match is made stronger if the neighbor Ni's has a similar relative position in both. There is a lower chance of mistaking a correspondence twice than once.

Continuing the analysis, one has two contradictory hypotheses that can be characterized as follows. Let H0 be the hypothesis that there are two images of TWO DIFFERENT PERSONS. Let H1 be the alternative hypothesis that there are two images of THE SAME PERSON.

One can define a neighbor of $(i_1,j_1)$, called $(k_1,l_1)$. In practice, for some adequate norm called $\| \|$, we mean by neighbor that $\|(i_1-k_1,j_1-l_1)\| \leq 1$, one can call $(i_2,j_2)$ the global best fit of $(i_1,j_1)$, and $(k_2,l_2)$ the global best fit of $(k_1,l_1)$. Now comes a fundamental probabilistic hypothesis. One "expects" when dealing with images of the same person (H1) (this is the argument of continuity) that $(k_2,l_2)$ is a "neighbor" of $(i_2,j_2)$, in the sense that $\|(k_2-i_2+i_1-k_1, l_2-j_2+j_1-l_1)\|$ is close to 0. One "expects", on the contrary, when images are from two different persons (H0), that $(k_2,l_2)$ should be located in any place of his search area with an equal probability. For example, one can imagine that the error criterions between $(k_1,l_1)$ and the possible $(k_2,l_2)$ are a bunch of random values, independent and of same law. The maximum of these values should be itself uniformly distributed in the area of search.

First, at a step 2302, one defines an area of size S where the system looks for the best fit. Next, at a step 2304 the operator defines t, a parameter of tolerance and identifies $V_1=(i_1-k_1,j_1-l_1)$ and $V_2=(i_2-k_2,j_2-l_2)$, two vectors that give the relative position of the two blocks in both images. We have in mind that $V_1$ and $V_2$ are close when we are dealing of the same person (H1), and on the contrary independents and of uniform law when dealing in case of different persons (H0).

We focus now on the following event: $\{\|V_1-V_2\|<t/2\}$, one can define that event as 'confirmation'. This event corresponds to an event of 'continuity' of the global best matches of $(i_1,j_1)$ and $(k_1,l_1)$ in the second image. Equivalently, this event may be described as the event where the global best match of $(k_1,l_1)$ coincides with a 'local' best match of $(k_1,l_1)$, only looked for in a small region around $(i_2+k_1-i_1, j_2+l_1-j_1)$. This event corresponds to exactly $(t-1)^2$ possible values of $V_2$. As said before, this event is weakly probable in the hypothesis (H0) of different persons. The total number of possible values for $V_2$ is S. In the hypothesis (H0), according to the hypothesis of uniformity, we have:

$$P((k_2,l_2) \text{ "confirms" } (i_1,j_1)|H0) = P(\|V_1-V_2\|<t/2|H0) = (t-1)^2/S$$

One can make a similar calculus for others neighbors of $(i_1,j_1)$, with the assumption that the place where all the best fit in I2 of these are independently placed, always following a random uniform law.

One finds that the probability, $C_p^k$, that k neighbors of $(i_1,j_1)$ out of p have their best fit in the same relative position in image I2 (modulo the tolerance) as in image I1 is, conditionally to the position of $(i_2,j_2)$ $$P(k \text{ 'confirmations' among neighbors of } (i_1,j_1)|H0) = [(t-1)^2/S]^k [1-(t-1)^2/S]^{p-k} C_p^k$$

Consider a numerical example. Take $(t-1)^2/S=10\%$. Take k=3 and p=4. There is a probability of k confirmations of 0.36%. By having found 3 neighbors of $(i_1,j_1)$ out of 4, under the assumption that images are different, the probability of this event is extremely small, i.e. the event is hard to believe.

The foregoing has dealt with only one block $B_{i1,j1}$ of the image I1, and its immediate neighbors. The analysis supposed that the best fit of the neighbors may be uniformly distributed in the area of research. If we process the same idea not starting from $B_{i1,j1}$ but from another block, for example $B_{i1',j1'}$, one can find first his absolute best fit in image I2, which one can call $(i_2', j_2')$. In a similar way, one can then look for the local best fit of the neighbors of $B_{i1', j1'}$ in an area of research centered on $(i_2', j_2')$ It is helpful to keep in mind that the local surface of research $(t-1)^2$ is very small, compared to the total surface of the image S. That means in practice that some local best fit searched in surface $(t-1)^2$ has few chances to be the global best fit in the whole image.

Now one can write generically for all the blocks of image I1, centered on the positions named $(i_{1,1}, j_{1,1})$, $(i_{1,2}, j_{1,2})$ ... $(i_{1,N}, j_{1,N})$. The likelihood of having, for the first block $k_1$ 'confirmations' among the neighbors of $(i_{1,1}, j_{1,1})$, for the second block $k_2$ 'confirmations'. . . , until $k_N$ confirmations for the ultimate block. Here $\epsilon$ stands for $(t-1)^2/S$.

$$P(k_1 \text{ 'confirmations' of } (i_{1,1}, j_{1,1}), \ldots k_N \text{ 'confirmations' of } (i_{1,N}, j_{1,N}) | H0) = \prod_{q=1}^{N} C_p^{k_q}(\varepsilon)^{k_q}(1-\varepsilon)^{p-k_q}$$

Recall that all this calculus takes place along the hypothesis that the two images are of two different persons. The preceding calculus gives us the joint rule of events of confirmation among all blocks. This means, in practice, one can evaluate with precision the probability of false positive match, i.e., the probability that one will attribute to two images of two different persons a high degree of similarity. In practice, the probability of wrong recognition is almost null.

Using this principle of continuity, which allows one to build a very discriminant rule to separate matches of neighboring pixel blocks that have occurred randomly, as opposed to matches due to real coherent correspondence because the faces containing the pixel blocks are the same, it is possible to complete the process of the flow diagram 2300 for determining a match. At a step 2306 the system calculates the best fit for each pixel block. At a step 2308 the system then determines a synthetic statistic indicator taking into account the occurrences of all 'confirmation' events. At a step 2310, the system then declares a match if the preceding statistic indicator was greater than the threshold defined at the step 2304, or a non-matched, if it is not so. We know the probability that the statistic indicator is stronger than its threshold, by accident, in H0, as opposed to because of a real match. Thus, by defining the threshold, it is possible for the operator to establish an arbitrarily rigorous criterion for matching, thus reducing the probability of a false positive to an arbitrarily low level.

While certain preferred embodiments have been disclosed herein, one of ordinary skill in the art would recognize other embodiments, which should be understood to be encompassed herein, as limited only by the claims. All patents, patent applications and other documents referenced herein are hereby incorporated by reference.

The invention claimed is:

1. A method of determining whether an acquired image matches a reference image, comprising:
   acquiring a digital image for comparison to a reference image;
   identifying a group of pixels in the acquired image;
   selecting the pixel group in the reference image that is the best match for the pixel group in the acquired image;
   repeating the preceding steps for at least one more group of pixels;
   comparing the relative locations of the selected pixel groups in the reference image and the pixel groups in the acquired image; and
   determining the probability that the relative locations occurred randomly.

2. A method of claim 1, further comprising:
   comparing the probability of a random match to a threshold probability for concluding that the images match.

3. A method of claim 2, wherein the threshold probability is set to reduce the probability of a false conclusion to an arbitrarily low number.

4. A method of claim 1,
   wherein finding the closest pixel group uses a least squares calculation of the differences between the pixel groups in the reference image and the pixel groups in the acquired image.

5. A method of claim 1, further comprising:
   upon acquiring the reference image and the acquired image, filtering the images prior to completing the additional steps.

6. A method of claim 5, wherein the filtering comprises:
   determining the luminance of a pixel based on an average of values of neighboring pixels;
   comparing the value of the luminance of the pixel to a threshold value;
   setting the filtered value of the pixel to zero if the luminance is below the threshold; and
   setting the filtered value of the pixel to one if the luminance is equal to or greater than the threshold value.

7. A method of claim 6, further comprising:
   normalizing the acquired image and the reference image by locating known features in a predetermined location.

8. A method of claim 1, wherein acquiring the image is accomplished by a vision processing system having a vision-based operating system.

9. A method of claim 1, further comprising:
   comparing the acquired image to more than one reference image.

10. A method of claim 1, wherein comparing the relative locations of the pixel groups of the acquired image and the pixel groups of the reference image comprises:
    defining a first vector between the first pixel group of the acquired image and a second pixel group of the acquired image;
    defining a second vector between the first pixel group of the reference image and the second pixel group of the reference image; and
    calculating an absolute value of the difference between the first vector and the second vector.

11. A method of claim 10, further comprising:
    repeating the calculation for additional pixel groups.

12. A method of claim 1, further comprising:
    comparing the probability of a random match to a threshold probability for concluding that the images match;
    repeating the steps for a different reference image; and allowing unlimited number of mismatches before allowing a match to one of the reference images.

13. A method of claim 1, further comprising:
upon determining a match, adding the acquired image to a database of reference images to facilitate future matches.

14. The method of claim 1, wherein the acquired digital image corresponds to a patch of skin.

15. A method of analyzing an image comprising:
acquiring a first surface area of a surface location of an image of a person to be analyzed;
retrieving a second surface area of the same surface location of a reference image;
identifying a first group of pixels in said first surface area;
selecting a second group of pixels from said second surface area that is a best match for said first group of pixels;
repeating the above steps for at least one more group of pixels in said first and second surface areas;
comparing the relative locations of said pixel groups in said first and second surface areas;
determining a probability that the relative locations occurred randomly; and
calculating a score representing a likelihood that said first and second surface areas are from the same person.

16. A system for determining whether an acquired image matches a reference image, comprising:
a camera for acquiring a digital image for comparison to a reference image;
an identification module for identifying a group of pixels in the acquired image;
a selection module for selecting the pixel group in the reference image that is the best match for the pixel group in the acquired image;
a comparison module for repeating the preceding steps for at least one more group of pixels and for comparing the relative locations of the selected pixel groups in the reference image and the pixel groups in the acquired image; and
a calculator for determining the probability that the relative locations occurred randomly.

17. A system of claim 16, further comprising:
a match module for comparing the probability of a random match to a threshold probability for concluding that the images match.

18. A system of claim 17, wherein the threshold probability is set to reduce the probability of a false conclusion to an arbitrarily low number.

19. A system of claim 16, wherein finding the closest pixel group uses a least squares calculation of the differences between the pixel groups in the reference image and the pixel groups in the acquired image.

20. A system of claim 16, further comprising:
a filter for filtering the images prior to completing the additional steps.

21. A system of claim 20, wherein the filtering comprises determining the luminance of a pixel based on an average of values of neighboring pixels, comparing the value of the luminance of the pixel to a threshold value, setting the filtered value of the pixel to zero if the luminance is below the threshold and setting the filtered value of the pixel to one if the luminance is equal to or greater than the threshold value.

22. A system of claim 21, further comprising:
a normalization module for normalizing the acquired image and the reference image by locating known features in a predetermined location.

23. A system of claim 16, wherein acquiring the image is accomplished by a vision processing system having a vision-based operating system.

24. A system of claim 16, further comprising: a comparison module for comparing the acquired image to more than one reference image.

25. A system of claim 16, wherein comparing the relative positions of the pixel groups of the acquired image and the pixel groups of the reference image comprises:
defining a first vector between the first pixel group of the acquired image and a second pixel group of the acquired image;
defining a second vector between the first pixel group of the reference image and the second pixel group of the reference image; and
calculating an absolute value of the difference between the first vector and the second vector.

26. A system of claim 16, wherein:
the calculator compares the probability of a random match to a threshold probability for concluding that the images match; and further including:
a reference image retrieval module for repeating the steps for a different reference image, wherein the system allows an unlimited number of mismatches before allowing a match to one of the reference images.

27. A system of claim 16, further comprising:
an image storage module for, upon determining a match, adding the acquired image to a database of reference images to facilitate future matches.

* * * * *

UNITED STATES PATENT AND TRADEMARK OFFICE
CERTIFICATE OF CORRECTION

PATENT NO. : 7,369,685 B2
APPLICATION NO. : 10/116839
DATED : May 6, 2008
INVENTOR(S) : Bruno C. DeLean It is certified that error appears in the above-identified patent and that said Letters Patent is hereby corrected as shown below:

On the title page item (73) Assignee, change "Identix Corporation" to --Identix Incorporated--.

Signed and Sealed this

Twenty-fourth Day of August, 2010

David J. Kappos
*Director of the United States Patent and Trademark Office*